(12) United States Patent
Osato et al.

(10) Patent No.: US 8,580,145 B2
(45) Date of Patent: Nov. 12, 2013

(54) LIQUID CRYSTALLINE POLYESTER AND PROCESS FOR PRODUCING SAME

(75) Inventors: Keiko Osato, Nagoya (JP); Koji Tachikawa, Nagoya (JP); Hideyuki Umetsu, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/386,584

(22) PCT Filed: Aug. 11, 2009

(86) PCT No.: PCT/JP2009/064149
§ 371 (c)(1),
(2), (4) Date: Jan. 23, 2012

(87) PCT Pub. No.: WO2011/018837
PCT Pub. Date: Feb. 17, 2011

(65) Prior Publication Data
US 2012/0119142 A1    May 17, 2012

(51) Int. Cl.
*C09K 19/06* (2006.01)
*C09K 19/52* (2006.01)
*C09K 19/30* (2006.01)
*C09K 19/12* (2006.01)
*C09K 19/00* (2006.01)
*C08F 283/00* (2006.01)

(52) U.S. Cl.
USPC .............. 252/299.6; 252/299.01; 252/299.63; 252/299.66; 428/1.1; 525/418

(58) Field of Classification Search
USPC .............. 252/299.01, 299.6, 299.63, 299.66; 428/1.1; 525/418
See application file for complete search history.

(56) References Cited

U.S. PATENT DOCUMENTS 7,862,745 B2 * 1/2011 Tano et al. ................ 252/299.6

FOREIGN PATENT DOCUMENTS

| JP | 56-010562 | 2/1981 |
|---|---|---|
| JP | 03-070730 | 3/1991 |
| JP | 11-322910 | 11/1999 |
| JP | 2002-037869 | 2/2002 |
| JP | 2004-196930 | 7/2004 |
| JP | 2004-244452 | 9/2004 |
| JP | 2004-256656 | 9/2004 |
| JP | 2005-213418 | 8/2005 |
| JP | 2007-100078 | 4/2007 |
| JP | 2007-154169 | 6/2007 |
| JP | 2009-108191 | 5/2009 |

* cited by examiner

*Primary Examiner* — Geraldina Visconti
(74) *Attorney, Agent, or Firm* — DLA Piper LLP (US)

(57) ABSTRACT

A liquid crystalline polyester has a specifically high fluidity, a low anisotropy, a high toughness, a low gas property, an excellent heat resistance and a high dielectric breakdown resistance. The liquid crystalline polyester includes 38 to 74 mol % of structural unit(s) obtained from a hydroxycarboxylic acid, 31 to 13 mol % of a structural unit obtained from 4,4'-dihydroxybiphenyl and 31 to 13 mol % of a structural unit obtained from 2,6-naphthalenedicarboxylic acid (100 mol % in total), characterized in that the hydroxycarboxylic acid structural units include a structural unit obtained from 2-hydroxy-6-naphthoic acid in an amount of 89 mol % or more and the average sequence length of the structural unit obtained from 2-hydroxy-6-naphthoic acid is 0.1 to 1.

12 Claims, 2 Drawing Sheets

LIQUID CRYSTALLINE POLYESTER AND PROCESS FOR PRODUCING SAME

RELATED APPLICATIONS

This is a §371 of International Application No. PCT/JP2009/064149, filed on Aug. 11, 2009 (WO 2011/018837 A1, published on Feb. 17, 2011), the entire contents of which is hereby incorporated by reference.

TECHNICAL FIELD

This disclosure relates to a technique of controlling the average sequence length of the structural units obtained from an aromatic hydroxycarboxylic acid of a highly heat-resistant liquid crystalline polyester in a very short range from 0.1 to 1, and a liquid crystalline polyester obtained by the technique, a composition thereof, and a molded article composed thereof.

BACKGROUND

Liquid crystalline polyesters are good in heat resistance, flowability, dimensional stability, flame retardancy and the like, and therefore are used in electric and electronic fields. In recent years, the demand for liquid crystalline polyesters has expanded, and especially the demand for highly heat-resistant liquid crystalline polyesters showing a thermal deformation temperature of 300° C. higher, called type I, is expanding. As liquid crystalline polyesters, known are liquid crystalline polyesters having the structural units obtained from p-hydroxybenzoic acid or 2-hydroxy-6-naphthoic acid as mesogen units, liquid crystalline polyesters having an aromatic diol/an aromatic dicarboxylic acid copolymerized with the structural units obtained from 2-hydroxybenzoic acid or 2-hydroxy-6-naphthoic acid, liquid crystalline polyesters having a polyalkylene terephthalate copolymerized with the structural units. Among them, it is known that a liquid crystalline polyester with 2-hydroxy-6-naphthoic acid as mesogen units is more excellent in dielectric property, dimensional stability and light resistance, though worse in heat resistance, than a liquid crystalline polyester with p-hydroxybenzoic acid as mesogen units (for example, JP 56-10562 A, JP 2002-37869 A, JP 2004-196930 A, JP 2004-244452 A, JP 2005-213418 A and JP 2007-100078 A).

JP 56-10562 A describes a liquid crystalline polyester obtained by copolymerizing 2-hydroxy-6-naphtoic acid, an aromatic diol and an aromatic dicarboxylic acid. However, a liquid crystalline polyester composition obtained by copolymerizing 2-hydroxy-6-naphthoic acid, an aromatic diol and an aromatic dicarboxylic acid has a low melting point and is not sufficient in heat resistance. JP 2002-37869 A describes a liquid crystalline polyester obtained by adding additives to a specific monomer. However, owing to the influence of the additives, heat resistance and dielectric breakdown resistance decline. Each of JP 2004-196930 A, JP 2004-244452 A, JP 2005-213418 A and JP 2007-100078 A describes a liquid crystalline polyester obtained by copolymerizing 2-hydroxy-6-naphthoic acid, an aromatic diol and an aromatic dicarboxylic acid. However, in JP 2004-196930 A, JP 2004-244452 A, JP 2005-213418 A and JP 2007-100078 A, since solid-phase polymerization is performed for enhancing the molecular weight, the polymer is low in randomness and is insufficient in dimensional stability and flowability.

It could therefore be helpful to provide a liquid crystalline polyester having specifically excellent flowability, low anisotropy, toughness, low self-gasification capability, excellent heat resistance and high dielectric breakdown resistance, a production process therefor, a composition thereof, and a molded article composed thereof.

SUMMARY

We discovered that if the sequence length of the structural units obtained from 2-hydroxy-6-naphthoic acid is controlled, a liquid crystalline polyester having specifically improved properties can be obtained.

We thus provide a liquid crystalline polyester comprising 38 to 74 mol % of the structural units obtained from a hydroxycarboxylic acid, 13 to 31 mol % of the structural units obtained from 4,4'-hydroxybiphenyl and 13 to 31 mol % of the structural units obtained from 2,6-naphthalenedicarboxylic acid, to achieve 100 mol % in total, wherein 89 mol % or more of the structural units obtained from the hydroxycarboxylic acid are the structural units obtained from 2-hydroxy-6-naphthoic acid, and the average sequence length of the structural units obtained from the 2-hydroxy-6-naphthoic acid is 0.1 to 1.

We provide a liquid crystalline polyester having specifically excellent flowability, low anisotropy, toughness, low self-gasification capability, excellent heat resistance and high dielectric breakdown resistance, and a production process therefor, a composition thereof, and a molded article composed thereof.

DETAILED DESCRIPTION

Figure 1:
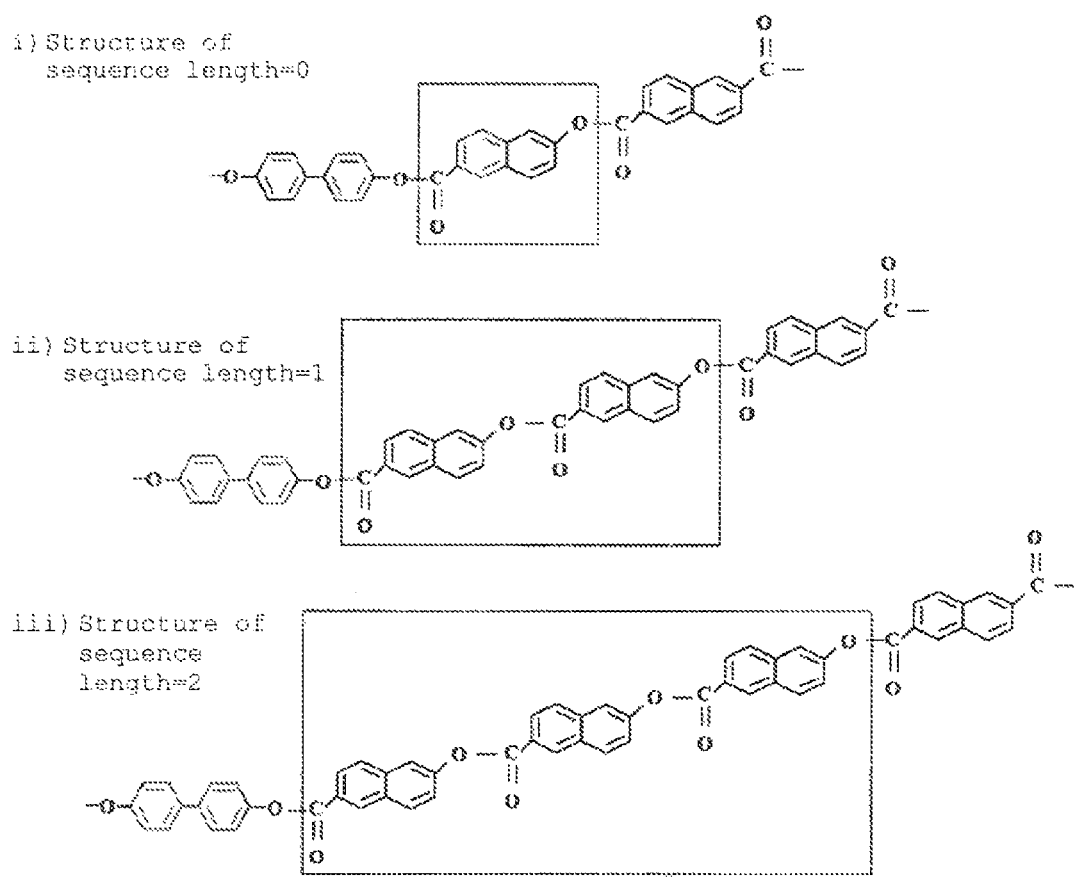
FIG. 1 illustrates the sequence lengths of the structural units obtained from 2-hydroxy-6-naphthoic acid.

Our liquid crystalline polyesters and methods are explained below in detail. The liquid crystalline polyester (A) is a liquid crystalline polyester comprising 38 to 74 mol % of the structural units obtained from a hydroxycarboxylic acid, 13 to 31 mol % of the structural units obtained from 4,4'-dihydroxybiphenyl and 13 to 31 mol % of the structural units obtained from 2,6-naphthalenedicarboxylic acid, to achieve 100 mol % in total, wherein 89 mol % or more of the structural units obtained from the hydroxycarboxylic acid are the structural units obtained from 2-hydroxy-6-naphthoic acid, and the average sequence length of the structural units obtained from the 2-hydroxy-6-naphthoic acid is 0.1 to 1.

The liquid crystalline polyester is a polyester called a "thermotropic" liquid crystalline polymer having optical anisotropy when melted.

The structural units obtained from a hydroxycarboxylic acid, the structural units obtained from 4,4'-dihydroxybiphenyl and the structural units obtained from 2,6-naphthalenedicarboxylic acid means that these structural units form ester linkages to form a polyester.

In the liquid crystalline polyester (A), for the structural units obtained from a hydroxycarboxylic acid, a hydroxycarboxylic acid such as 2-hydroxy-6-naphthoic acid, 2-hydroxy-3-naphthoic acid, 1-hydroxy-4-naphthoic acid, m-hydroxybenzoic acid, 4'-hydroxy-4-biphenylcarboxylic acid, 4-hydroxy-2-phenylbenzoic acid, 3-t-butyl-4-hydroxybenzoic acid, 3,5-di-t-butyl-4-hydroxybenzoic acid or 4-hydroxycinnamic acid or the methyl ester derivative of any of these hydrocarboxylic acids can be used as a raw material.

The most preferred hydroxycarboxylic acid is 2-hydroxy-6-naphthoic acid.

In the liquid crystalline polyester (A), for the structural units obtained from 4,4'-dihydroxybiphenyl, for example, 4,4'-dihydroxybiphenyl can be used as a raw material.

In the liquid crystalline polyester (A), as the structural units obtained from 2,6-naphthalenedicarboxylic acid, for example, the structural units obtained from 2,6-naphthalenedicarboxylic acid or the structural units obtained from an ester-forming derivative of 2,6-naphthalenedicarboxylic acid can be used as a raw material.

It is preferred that the liquid crystalline polyester (A) has methoxycarbonyl groups as end groups. Especially in the case where dimethyl 2,6-naphthalenedicarboxylate is used as a raw material, a liquid crystalline polyester having methoxycarbonyl groups and/or hydroxyl groups as end groups can be obtained to inhibit the generation of acetic acid gas and carbonic acid gas, thus providing the effect of decreasing the self-gasification rate.

To obtain such features as excellent flowability, low anisotropy, toughness, excellently low self-gasification capability and higher dielectric breakdown resistance, the liquid crystalline polyester (A) comprises 38 to 74 mol % of the structural units obtained from a hydroxycarboxylic acid, 31 to 13 mol % of the structural units obtained from 4,4'-dihydroxybiphenyl and 31 to 13 mol % of the structural units obtained from 2,6-napthalenedicarboxylic acid based on 100 mol % of all the structural units in total. It is preferred that the liquid crystalline polyester (A) comprises 40 to 44 mol % of the structural units obtained from a hydroxycarboxylic acid, 28 to 30 mol % of the structural units obtained from 4,4'-dihydroxybiphenyl and 28 to 30 mol % of the structural units obtained from 2,6-naphthalenedicarboxylic acid.

It is preferred that the liquid crystalline polyester (A) comprises 38 to 74 mol % of the structural units obtained from a hydroxycarboxylic acid, 13 to 31 mol % of the structural units obtained from 4,4'-dihydroxybiphenyl and 13 to 31 mol % of the structural units obtained from 2,6-napthalenedicarboxylic acid, wherein the hydroxycarboxylic acid is 2-hydroxy-6-naphthoic acid.

It is more preferred that the liquid crystalline polyester (A) comprises 40 to 44 mol % of the structural units obtained from a hydroxycarboxylic acid, 28 to 30 mol % of the structural units obtained from 4,4'-dihydroxybiphenyl and 28 to 30 mol % of the structural units obtained from 2,6-naphthalenedicarboxylic acid, wherein the hydroxycarboxylic acid is 2-hydroxy-6-naphthoic acid.

Further, in when decreasing anisotropy, it is preferred that in the liquid crystalline polyester (A), 89 to 99.9 mol % of the structural units obtained from the hydroxycarboxylic acid is the structural units obtained from 2-hydroxy-6-naphthoic acid, while the remaining 0.1 to 11 mol % is the structural units obtained from 3,5-di-t-butyl-4-hydroxybenzoic acid. In the case where the object is to obtain the effect of decreasing anisotropy, it is more preferred that 95 to 98.9 mol % of the structural units obtained from the hydroxycarboxylic acid is the structural units obtained from 2-hydroxy-6-naphthoic acid, while the remaining 1.1 to 5 mol % is the structural units obtained from 3,5-di-t-butyl-4-hydroxybenzoic acid.

It is preferred that the structural units obtained from 3,5-di-t-butyl-4-hydroxybenzoic acid are used, for such reasons that the difference between the polymerization rate of 2-hydroxy-6-naphthoic acid and the polymerization rate of another monomer can be moderated by the interposed 3,5-di-t-butyl-4-hydroxybenzoic acid, to inhibit the bumping or the like otherwise caused by the two-phase formation of the system in the polymerization reaction process, for widening available production conditions, and that the anisotropy of the obtained liquid crystalline polyester can be improved.

It is preferred that among the structural units of the liquid crystalline polyester (A), the molar ratio of the structural units obtained from 4,4'-dihydroxybiphenyl to the structural units obtained from 2,6-naphthalenedicarboxylic acid is 0.8 to 1.2. A more preferred range is 0.9 to 1.1, and further more preferred is 1.0. It is preferred that the molar ratio of the structural units obtained from 4,4'-dihydroxyphenyl to the structural units obtained from 2,6-naphthalenedicarboxylic acid is 0.8 to 1.2, since a sufficient polycondensation rate can be obtained. It is more preferred that the molar ratio is 0.9 to 1.1, since the self-gasifiedion rate becomes low. A molar ratio of 1.0 is the most preferred, since the obtained liquid crystalline polyester (A) has specifically excellent flowability, low anisotropy and high heat resistance.

In the liquid crystalline polyester (A), the average sequence length of the structural units obtained from 2-hydroxy-6-naphthoic acid is 0.1 to 1. If the average sequence length of the structural units obtained from 2-hydroxy-6-naphthoic acid is 0.1 to 1, flowability, anisotropy and low toughness affected by the interaction between the molecular chains of the structural units obtained from 2-hydroxy-6-naphthoic acid and by the maldistribution of crystal sites can be improved. It is preferred that the average sequence length of the structural units obtained from 2-hydroxy-6-naphthoic acid is 0.2 to 0.8.

If the average sequence length of the structural units obtained from 2-hydroxy-6-naphthoic acid is less than 0.1, the rate of the mesogen units obtained from the structural units of 2-hydroxy-6-naphthoic acid in the molecular chains is too low, and the properties as a liquid crystalline polyester cannot be exhibited.

Further, if the average sequence length of the structural units obtained from 2-hydroxy-6-naphthoic acid is larger than 1, the expected properties of the liquid crystalline polyester cannot be obtained. Especially flowability declines and anisotropy increases.

The sequence length of the structural units obtained from 2-hydroxy-6-naphthoic acid is explained below.

The sequence length of the structural units obtained from 2-hydroxy-6-naphthoic acid is an indicator that expresses the number of structural units obtained from 2-hydroxy-6-naphthoic acid, with which another structural unit obtained from 2-hydroxy-6-naphthoic acid is linked via one each ester linkage formed without the intervention of a structural unit obtained from another monomer.

FIG. 1 illustrates the sequence length of the structural units obtained from 2-hydroxy-6-naphthoic acid. FIG. 1 illustrates cases where there are three types of structural units; a structural unit(s) obtained from 2-hydroxy-6-naphthoic acid, a structural unit obtained from 4,4'-dihydroxybiphenyl and a structural unit obtained from 2,6-naphthalenedicarboxylic acid. In the case where one structural unit of 2-hydroxy-6-naphthoic acid group is linked with 4,4'-dihydroxybiphenyl and 2,6-naphthalenediol via one each ester linkage, the sequence length is 0 (FIG. 1, i). In the case where one structural unit of 2-hydroxy-6-naphthoic acid is linked with another structural unit of 2-hydroxy-6-napthoic acid via an ester linkage and where the respective other ends of the structural units is not linked with 2-hydroxy-6-naphthoic acid via one each ester linkage, the sequence length is 1 (FIG. 1, ii). Likewise, in the case where three structural units of 2-hydroxy-6-napthoic acid are linked with each other via one each ester linkage and where the respective other ends of the structural units existing at both the end positions among the three structural units are not linked with 2-hydroxy-6-naphthoic acid via one each ester linkage, the sequence length is 2 (FIG. 1, iii).

The average sequence length of the structural units obtained from 2-hydroxy-6-naphthoic acid is the number average value of the sequence lengths of the structural units obtained from 2-hydroxy-6-naphthoic acid in the liquid crystalline polyester. The average sequence length is the mean value of the sequence lengths of all the structural units obtained from the 2-hydroxy-6-naphthoic acid existing in the polymer, and can be measured by nuclear magnetic resonance (NMR) spectrum measurement. For example, in the case where $^{13}C$-NMR is used, the polymer is dissolved in a mixed solvent of pentafluorophenol and deuterated chloroform, and the shifting of the carbon at the 2-position of a structural unit obtained from 2-hydroxy-6-naphthoic acid separates the structure (peak A) bound to the 6-position of another structural unit obtained from 2-hydroxy-6-naphthlic acid via an ester linkage from the structure (peak B) bound to 2,6-naphthalenedicarboxylic acid. Therefore, using the respective peak areas (the peak A area (a) and the peak B area (b)), the average sequence length of the structural units obtained from 2-hydroxy-6-naphthoic acid is calculated from a/b.

Figure 2:
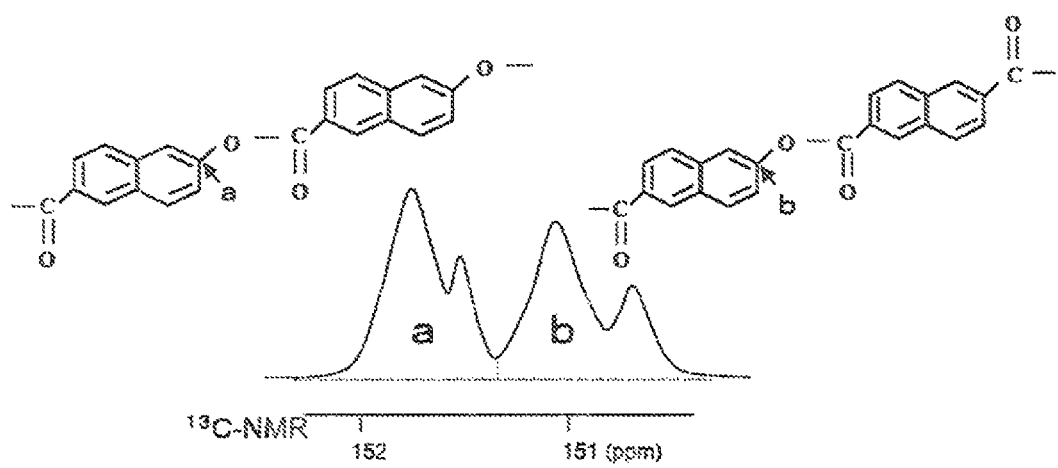
FIG. 2 is a typical view of the chart by $^{13}$C-NMR used for calculating the average sequence length of the structural units obtained from 2-hydroxy-6-naphthoic acid.

FIG. 2 is a typical view of the chart by $^{13}C$-NMR used for the calculation of the average sequence length of the structural units obtained from 2-hydroxy-6-naphtoic acid. Symbol a denotes the peak intensity of the $^{13}C$-NMR peak A originating from the carbon atom at the 2-position of the structural unit of 2-hydroxy-6-naphthoic acid, ester-linked with another structural unit of 2-hydroxy-6-naphthoic acid at the hydroxyl group of the 2-position. Symbol b denotes the peak intensity of the $^{13}C$-NMR peak B originating from the carbon atom at the 2-position of the structural unit of 2-hydroxy-6-naphthoic acid, ester-linked with the carboxylic acid of the structural unit of 2,6-naphthalenedicarboxylic acid at the hydroxyl group of the 2-position.

The average sequence length calculation method is described in Polymer Journal, 25 (3), 315 (1993) by Suenaga et al. In the average sequence length by Suenaga et al.'s method, a monomer having none of the p-oxybenzoyl structural units thereof ester-linked with a p-oxybenzoyl structural unit is expressed to have average sequence length=1. However, a monomer is not a sequence, and it is not preferred to express that a monomer has a sequence length of 1 when a sequence length is discussed. Therefore, a monomer is expressed to have, an average sequence length of 0, and a calculation formula obtained by subtracting 1 from the calculation formula of Suenaga et al. is used.

It is preferred in view of mechanical strength and moldability that the number average molecular weight of the liquid crystalline polyester (A) is 3,000 to 25,000. A more preferred range is 5,000 to 20,000, and a further more preferred range is 8,000 to 18,000.

The number average molecular weight is obtained by dissolving a liquid crystalline polyester (A) into a solvent capable of dissolving the liquid crystalline polyester (A) such as pentafluorophenol and measuring by GPC-LS (gel permeation chromatography-light scattering) method.

It is preferred in view of flowability that the melt, viscosity of the liquid crystalline polyester (A) is 1 to 200 Pa·s. A more preferred range is 10 to 200 Pa·s, and an especially preferred range is 10 to 100 Pa·s. The melt viscosity is a value obtained by measuring at the melting point of the liquid crystalline polyester+20° C. and at a shear rate of 1,000/s using a Koka type flow tester.

In this description, the melting point (Tm) refers to the endothermic peak temperature (Tm2) observed in the process of the differential scanning calorimetry of observing the endothermic peak temperature (Tm1) while heating a polymer produced by polymerization from room temperature at a heating rate of 20° C./min, holding at a temperature of Tm1+20° C. for 5 minutes, once cooling to room temperature at a cooling rate of 20° C./min, and heating again at a heating rate of 20° C./min.

The liquid crystalline polyester (A) has high toughness, low anisotropy, low self-gasification capability and excellent dielectric breakdown resistance.

It is preferred that the liquid crystalline polyester (A) is produced by melt-polymerizing in a temperature range from the (melting point of the obtained liquid crystalline polyester+20° C.) to (the melting point +40° C.). If the liquid crystalline polyester is produced by melt-polymerizing in a temperature range from (the melting point of the obtained liquid crystalline polyester+20° C.) to (the melting point +40° C.), a sufficient heat quantity to homogenize the liquid crystalline polyester can be applied, and further the coloration and the decline of physical properties due to the progression of the thermal decomposition of the polymer do not occur.

It is more preferred that the liquid crystalline polyester (A) is produced by melt-polymerizing in temperature range from (the melting point of the obtained liquid crystalline polyester+25° C.) to (the melting point +35° C.), since the obtained liquid crystalline polyester (A) is specifically homogeneous and has as low anisotropy as 0.1 to 1 as the average sequence length of the structural units obtained from 2-hydroxy-6-naphthoic acid, and excellent flowability and toughness.

The melting point of the obtained liquid crystalline polyester is a value decided by the chemical composition of the polyester, and is obtained by melt-polymerizing to produce the liquid crystalline polyester in a temperature range from the temperature of allowing at least the product to be perfectly melted to 390° C.; and performing the differential scanning calorimetry of the obtained liquid crystalline polyester.

In the process for producing the liquid crystalline polyester (A), the reaction system is controlled at the highest temperature reached during the melt polymerization reaction preferably for 1 to 3 hours, more preferably 1.2 to 2.5 hours, to sufficiently advance the reaction of the 2,6-naphthalenedicarboxylic acid derivative and not to advance the thermal decomposition of the polymer. If the reaction system resides at the highest temperature reached during the melt polymerization reaction for 1 to 3 hours, the randomization of the polymer is promoted, and the liquid crystalline polyester (A) having the desired average sequence length is likely to be obtained.

In the process for producing the liquid crystalline, polyester (A), it is preferred that the reaction is performed at, atmospheric pressure in a nitrogen stream at the highest temperature reached during the melt polymerization reaction.

The melt polymerization for producing the liquid crystalline polyester (A) can be performed, for example, by any of the following processes.

(1) Process of producing a liquid crystalline polyester by a melt, de-acetic acid polycondensation reaction from acetoxycarboxylic acids including 2-acetoxy-6-naphthoic acid, 4,4'-diacetoxybiphenyl and 2,6-naphthalenedicarboxylic acid.

(2) Process of producing a liquid crystalline polyester by making acetic anhydride react with hydroxycarboxylic acids including 2-hydroxy-6-naphthoic acid, 4,4'-dihydroxybiphenyl and 2,6-naphthalenedicarboxylic acid, for acylating phenolic hydroxyl groups, and subsequently performing a melt de-acetic acid polycondensation reaction (3) Process of producing a liquid crystalline polyester by a melt de-phenol polycondensation reaction from the phenyl esters of hydroxycarboxylic acids including 2-hydroxy-6-naphthoic acid, 4,4'-dihydroxybiphenyl and the diphenyl ester of 2,6-naphthalenedicarboxylic acid (4) Process of producing a liquid crystalline polyester by making a predetermined amount of diphenyl carbonate react with hydroxycarboxylic acids including 2-hydroxy-6-naphthoic acid and 2,6-naphthalenedicarboxylic acid, to obtain the respective diphenyl esters, and subsequently adding 4,4'-dihydroxybiphenyl and performing, a melt de-phenol polycondensation reaction (5) Process of producing a liquid crystalline polyester by making acetic anhydride react with hydroxycarboxylic acids including 2-hydroxy-6-napthoic acid and 4,4'-dihydroxybiphenyl, for acylating some of phenolic hydroxyl groups, and subsequently distilling away acetic acid by melt de-acetic acid polycondensation, adding dimethyl 2,6-naphthalenedicarboxylate, to perform a melt de-methanol polycondensation reaction with the remaining hydroxyl groups (6) A process of producing a liquid crystalline polyester by making acetic anhydride react with hydroxycarboxylic acids including 2-hydroxy-6-naphthoic acid and 4,4'-dihydroxybiphenyl, for acylating phenolic hydroxyl groups, and subsequently removing the generated acetic acid from the system, while adding dimethyl 2,6-naphthalenedicarboxylate, to perform a melt de-acetic acid/de-methyl acetate polycondensation reaction As the melt polymerization process for producing a liquid crystalline polyester, it is preferred that a liquid crystalline polyester is produced by combining two or more steps selected from the step of polymerizing by the de-acetic acid polycondensation of acetyl groups and a carboxylic acid, the step of polymerizing by the de-methyl acetate polycondensation of methoxycarbonyl groups and acetyl groups and the step of polymerizing by the de-methanol polycondensation of methoxycarbonyl groups and hydroxyl groups, as described above in (5) and (6).

If a liquid crystalline polyester is produced by combining two or more steps selected from the step of polymerizing by the de-acetic acid polycondensation of acetyl groups and a carboxylic acid, the step of polymerizing by the de-methyl acetate polycondensation of methoxycarbonyl groups and acetyl groups and the step of polymerizing by the de-methanol polycondensation of methoxycarbonyl groups and hydroxyl groups, the end structure has hydroxyl groups, acetyl groups, methoxycarbonyl groups, carboxyl groups, etc., and in the case where the end structure has methoxycarbonyl groups and/or hydroxyl groups, the polymer has few acetyl group ends, and therefore is very small in the generated amount of acetic acid, being excellent in low self-gasification capability.

Especially in the above description, the liquid crystalline polyester produced by a production process containing the step of polymerizing by the de-methanol polycondensation of methoxycarbonyl groups and hydroxyl groups is more preferred, since the liquid crystalline polyester has at least hydroxyl groups and methoxycarbonyl groups at the ends and is high in the effect of lowering the self-gasification capability, having excellent heat resistance.

In the production process containing the step of polymerizing by the de-methanol polycondensation of methoxycarbonyl groups and hydroxyl groups, for example, if 2-hydroxy-6-naphthoic acid and 4,4'-dihydroxybiphenyl are used as they are for polymerization, to use the difference between acetyl groups and hydroxyl groups in reactivity, a liquid crystalline polyester having hydroxyl groups preferentially as polymer end groups can be obtained.

The liquid crystalline polyester (A) has any of acetyl groups, hydroxyl groups, methoxycarbonyl groups and carboxyl groups as end groups, and the end groups the liquid crystalline polyester (A) has can be determined by dissolving the polyester into a solvent capable of dissolving the polymer, for example, a mixed solvent of pentafluorophenol/deuterated chloroform=50/50, measuring by $^1$H-NMR and determining from the obtained spectrum.

Further, with regard to the liquid crystalline polyester fixed in the sequence obtained by melt polymerization, for example, the obtained pellets of the polyester or the pieces obtained by shattering the pellets by a frost shattering machine can also be heated in a nitrogen stream or under reduced pressure in a temperature range from (the melting point of the liquid crystalline polyester −5° C.) to (the melting point −50° C.) (for example 200 to 300° C.) for 1 to 50 hours, to be polycondensed to a desired polymerization degree, for being enhanced in viscosity.

According to the abovementioned production process, unlike the conventional solid-phase polymerization process, the sequence of the liquid crystalline polyester obtained by the melt polymerization process at a stage before solid-phase polymerization is sufficiently randomized, and consequently still after solid-phase polymerization, the random sequence is kept without adversely affecting the structural units obtained from 2-hydroxy-6-naphtoic acid.

In the process for producing the liquid crystalline polyester (A), to control the average sequence length of the structural units obtained from 2-hydroxy-6-naphoic acid, a randomization catalyst can also be used at the time of polymerization.

The randomization catalyst in this description refers to a catalyst capable of promoting the exchange reaction between the ester linkages of the sequence of the structural units obtained from 2-hydroxy-6-naphthoic acid and the hydroxyl groups or carboxyl groups of 2,6-naphthalenedicarboxylic acid or 4,4'-dihydroxybiphenyl, or ester groups formed by those groups in the latter half of polymerization.

The randomization catalyst is required to act even at high temperatures of 300° C. and higher under an acid condition, etc. Examples of the randomization catalyst include metal acetates such as sodium acetate, potassium acetate, aluminum acetate, manganese acetate, tin acetate, lead acetate and, calcium acetate, metal salts of phosphorus-based compounds such as potassium phosphate, sodium phosphate, sodium phosphite, potassium phosphite, sodium hypophosphite, calcium hypophosphite, sodium metaphosphate and potassium metaphosphate, metal halides having strong Lewis acid property such as hafnium chloride and scandium chloride, etc.

Among them, sodium hypophosphite, sodium acetate and calcium phosphate can be preferably used, since they have a high randomization effect. Especially sodium hypophosphite and sodium acetate are preferred for such reasons that a polymerization promotion effect can be obtained as well as a randomization effect and that the anisotropy of the obtained liquid crystal polyester can also be decreased.

It is preferred that the added amount, of the randomization catalyst is 0.001 to 0.1 wt %. A more preferred range is 0.005 to 0.08 wt %, and a further more preferred range is 0.02 to 0.05 wt %.

If the added amount of the randomization catalyst is 0.001 to 1 wt %, heat resistance is good, and if the amount is 0.005 to 0.08 wt %, higher heat resistance and a sufficient randomization effect can be obtained. It is further more preferred that the amount is 0.02 to 0.05 wt %, since the balance between the polymerization promotion effect and the randomization effect is good.

The melt polycondensation reaction for producing the liquid crystalline polyester (A) takes place even without the catalyst.

As the polymerization catalyst capable of catalyzing three types of polycondensation, i.e., de-acetic acid polycondensation, de-methyl acetate polycondensation and de-methanol polycondensation, a metal compound such as dibutyltin oxide, tetrabutyl titanate, antimony trioxide or magnesium metal can be preferably used. As the catalyst, dibutyltin oxide or tetrabutyl titanate is more preferred, since the effects of catalyzing the three types of polycondensation are equal. Especially dibutyltin oxide has a high capability of catalyzing de-methanol polycondensation and de-methyl acetate polycondensation. Dibutyltin oxide is preferred for such reasons that the polymerization can take place in good balance in the case where the liquid crystalline polyester (A) is produced by combining two or more steps selected from the step of polymerizing by the de-acetic acid polycondensation of acetyl, groups and a carboxylic acid, the step of polymerizing by the de-methyl acetate polycondensation of methoxycarbonyl groups and acetyl groups, and the step of polymerizing by the de-methanol polycondensation of methoxycarbonyl groups and hydroxyl groups, and that the two-phase formation of the system and partial precipitation are unlikely to occur.

It is preferred that the added amount of the polymerization catalyst is 0.001 to 1 wt % based on the weight of the obtained liquid crystalline polyester (A). A more preferred range is 0.01 to 0.5 wt %, and a further more preferred range is 0.02 to 0.05 wt %.

If the added amount of the polymerization catalyst is 0.001 to 1 wt % based on the weight of the obtained liquid crystalline polyester (A), a sufficient catalyst effect can be obtained. It is more preferred that the amount is 0.01 to 0.5 wt % based on the weight of the obtained liquid crystalline polyester (A), since the polymerization rates can be balanced in the case where the liquid crystalline polyester (A) is produced by combining two or more steps selected from the step of polymerizing by the de-acetic acid polycondensation of acetyl groups and a carboxylic acid, the step of polymerizing by the de-methyl acetate polycondensation of methoxycarbonyl groups and acetyl groups, and the step of polymerizing by the de-methanol polycondensation of methoxycarbonyl groups and hydroxyl groups. It is more preferred that the added amount of the polymerization catalyst is 0.02 to 0.05 wt % based on the weight of the obtained liquid crystalline polyester (A), for such reasons that the polymerization rates of the two polycondensation systems can be balanced, and that high polymerization rates can be obtained.

The liquid crystalline polyester (A) can be preferably mixed with a liquid crystalline polyester (B) comprising the following structural units, to form a liquid crystalline polyester composition. If the liquid crystalline polyester comprising the following structural units is mixed, anisotropy can be further decreased and the toughness can be further enhanced, flowability being able to be further enhanced.

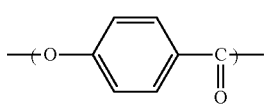
(I)

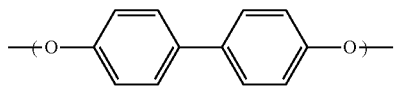
(II)

(III)

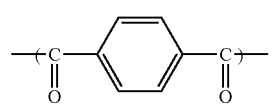
(IV)

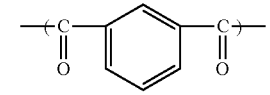
(V)

The abovementioned structural unit (I) is preferably a structural unit produced from p-hydroxybenzoic acid. The structural unit (II) is preferably a structural unit produced from 4,4'-dihydroxybiphenyl. The structural unit (III) is preferably a structural unit produced from hydroquinone. The structural unit (IV) is preferably a structural unit produced from terephthalic acid. The structural unit (V) is preferably a structural unit produced from isophthalic acid.

It is preferred that the amount of the structural units (I) is 65 to 80 mol % based on the total amount of the structural units (I), (II) and (III), since the effect of decreasing anisotropy by blending with the liquid crystalline polyester (A) can be remarkably obtained. Further, it is preferred that the amount of the structural units (II) is 65, to 73 mol % based on the total amount of the structural units (II) and (III), since the effect of enhancing flowability can be remarkably obtained. It is preferred that the amount of the structural units (IV) is 60 to 92 mol % based on the total amount of the structural units (IV) and (V), since the effect of enhancing flowability can be remarkably obtained.

The liquid crystalline polyester (B) can be produced according to a known polycondensation process for producing a polyester.

It is preferred in view of compatibility that the number average molecular weight of the liquid crystalline polyester (B) is 3,000 to 25,000. A more preferred range is 5,000 to 20,000, and a further more preferred range is 8,000 to 18,000.

The number average molecular weight is obtained by dissolving the liquid crystalline polyester (B) into a solvent capable of dissolving the polyester such as pentafluorophenol and measuring the solution by GPC-LS (gel permeation chromatography-light scattering) method.

In view of the compatibility between the liquid crystalline polyester (B) and the liquid crystalline polyester (A), it is preferred that the melt viscosity of the liquid crystalline polyester (B) is 1 to 200 Pa·s. A more preferred range is 10 to 200 Pa·s, and a further more preferred range is 10 to 100 Pa·s. The melt viscosity is a value obtained by measuring at the melting point of the liquid crystalline polyester+10° C. and at a shear rate of 1,000/s using a Koka type flow tester.

The mixing ratio of the liquid crystalline polyester (A) and the liquid, crystalline polyester (B) with the total amount of (A) and (B) as 100 wt % is preferably 0.1 to 99.9 wt % of the liquid crystalline polyester (A) and 99.9 to 0.1 wt % of the liquid crystalline polyester (B), more preferably 50 to 99 wt % of the liquid crystalline polyester (A) and 1 to 50 wt % of the liquid crystalline polyester (B), and further more preferably 80 to 95 wt % of the liquid crystalline polyester (A) and 5 to 20 wt % of the liquid crystalline polyester (B).

The composition consisting of the liquid crystalline polyester (A) and the liquid crystalline polyester (B) can be produced by solution mixing, melt kneading or the like, and melt kneading is preferred.

For melt kneading, a known method can be used. For example, a Banbury mixer, rubber roll machine, kneader, single- or twin-screw extruder or the like can be used to melt-knead in a temperature range from the melting point of the liquid crystalline polyester (A) −20° C. to the melting point +50° C., for obtaining the intended, resin composition. It is preferred that a twin-screw extruder is used for melt kneading in a temperature range from the melting point −10° C. to the melting point +10° C., to obtain a composition with especially high flowability.

The liquid crystalline polyester can contain a filler. It is preferred to use a filler, since such effects as higher strength, higher roughness, higher heat resistance, lower self-gasification capability and decreased anisotropy can be obtained.

The liquid crystalline polyester composition can contain a filler. It is preferred to use a filler, since such effects as higher strength, higher roughness, higher heat resistance, lower self-gasification capability and decreased anisotropy can be obtained.

As the filler, for example, a fibrous, sheet-like, powdery, granular or other filler can be used. Examples of the filler include fibrous fillers such as glass fibers, PAN-based and pitch-based carbon fibers, metal fibers such as stainless steel fibers, aluminum fibers and brass fibers, organic fibers such as aromatic polyamide fibers and liquid crystalline polyester fibers, gypsum fibers, ceramic fibers, asbestos fibers, zirconia fibers, alumina fibers, silica fibers, titanium, oxide fibers and silicon carbide fibers, rock wool, whisker fillers such as potassium titanate whiskers, barium titanate whiskers, aluminum borate whiskers and silicon nitride whiskers, and powdery, granular and sheet-like fillers such as mica, talc, kaolin, silica, glass heads, glass flakes, clay, molybdenum disulfide, wollastonite, titanium oxide, zinc oxide, calcium polyphosphate and graphite. The filler can be used after treating the surface of the filler by a known coupling agent such as a silane-based coupling agent or titanate-based coupling agent or any other surface treating agent.

Among these fillers, especially glass fibers can be preferably used in view of balance between availability and mechanical strength. The glass fibers can be selected, for example, from long fibers and short fibers such as chopped strands and milled fibers. Two, or more types of glass fibers can also be used together. As the glass fibers, weak alkaline fibers excellent in view of mechanical strength can be preferably used. Especially glass fibers with a silicon oxide content of 50 to 80 wt % can be preferably used, and glass fibers with a silicon oxide content of 65 to 77 wt % are more preferred. Further, it is preferred that the glass fibers are treated by an epoxy-based, urethane-based, acrylic or other covering or bundling agent, and especially an epoxy-based covering or bundling agent is preferred. Furthermore, it is preferred that the glass fibers are treated by a silane-based, titanate-based or other coupling agent or any other surface treating agent. It is especially preferred that the glass fibers are treated by an epoxysilane-based or aminosilane-based coupling agent.

The glass fibers can also be covered or bundled with a thermoplastic resin such as ethylene/vinyl acetate copolymer or a thermosetting resin such as an epoxy resin.

It is preferred that the mixing amount of the filler is usually 0.1 to 200 parts by weight per 100 parts by weight of the liquid crystalline polyester since the effect of enhancing the deflection temperature under load by the filler can be obtained. It is preferred that the amount is 1 to 150 parts by weight, since an especially excellent effect of decreasing anisotropy can be obtained.

It is preferred that the mixing amount of the filler is usually 0.1 to 200 parts by weight per 100 parts by weight of the liquid crystalline polyester composition, since the effect of enhancing the deflection temperature under load by the filler can be obtained. It is preferred that the amount is 1 to 150 parts by weight since an especially excellent effect of decreasing anisotropy can be obtained.

The liquid crystalline polyester or the liquid crystalline polyester composition can further be imparted with predetermined properties by containing an antioxidant, thermal stabilizer, ultraviolet light absorber, coloration preventive such as a phosphite or hypophosphite, lubricant, releasing agent, colorant including a dye or pigment, electroconductive agent, carbon black as a colorant, crystal nucleating agent, plasticizer, flame retarder, flame retardation aid, antistatic agent and other ordinary additives, and a polymer other than a thermoplastic resin.

For the liquid crystalline polyester or the liquid crystalline polyester composition, examples of the thermal stabilizer include hindered phenol, hydroquinone, phosphites and substitution products thereof. Examples of the ultraviolet light absorber include resorcinol and salicylates. Examples of the releasing agent include montanic acid, metal salts thereof, esters thereof, half esters thereof, stearyl alcohol, stearamide and polyethylene wax. Examples of the flame retarder include bromine-based flame retarders, phosphorus-based flame retarders, red phosphorus and silicone-based flame retarders.

The method for mixing a filler and additives with the liquid crystalline polyester can be dry blending, solution mixing, addition during the polymerization for producing the liquid crystalline polyester, melt kneading, etc. Among them, melt kneading is preferred.

For melt kneading, a known method can be used. For example, a Banbury mixer, rubber roll machine, kneader, single- or twin-screw extruder or the like can be used for melt-kneading at the melting point of the liquid crystalline polyester+50° C. or lower, to produce the intended resin composition. Among them, a twin-screw extruder is preferred.

The kneading method can be, for example, any of the following kneading methods.
1) Overall kneading method of kneading a liquid crystalline polyester (A), a filler and other additives together at a time
2) Method of at first preparing a liquid crystalline polyester composition as master pellets by making a liquid crystalline polyester (A) contain additives at high concentrations, and adding an additional liquid crystalline polyester (A), a filler and additional additives to the master pellets, to achieve the specified concentrations (master pellets method)
3) Divisional addition method of kneading a liquid crystalline polyester (A) and some of additives, and then adding a filler and the remaining additives
(4). Method of producing a liquid crystalline polyester composition consisting of a liquid crystalline polyester (A) and a liquid crystalline polyester (B), and subsequently kneading the liquid crystalline composition pellets, a filler and additives together at a time
5) Method of producing a liquid crystalline polyester composition consisting of a liquid crystalline polyester (A) and a liquid crystalline polyester (B), subsequently preparing a liquid crystalline polyester composition as master pellets by making the liquid crystalline composition contain additives at high concentrations, and then adding an additional liquid crystalline polyester composition consisting of the liquid crystalline polyester (A) and the liquid crystalline polyester (B), a filler and additional additives to achieve the specified concentrations (master pellets method)
6) Divisional addition method of producing a liquid crystalline polyester composition consisting of a liquid crystalline polyester (A) and a liquid crystalline polyester (B), subsequently once kneading the liquid crystalline polyester composition consisting of the liquid crystalline polyester (A) and the liquid crystalline polyester (B) and some additives, and then adding a filler and the remaining additives.
7) Overall kneading method of kneading a liquid crystalline polyester (A), a liquid crystalline polyester (B), a filler and additives together at a time The liquid crystalline polyester composition has high toughness, low anisotropy, low self-gasification capability and excellent dielectric breakdown resistance.

The liquid crystalline polyester can be molded into a molded article with excellent surface appearance (color tone), mechanical properties, heat resistance and flame retardancy by an ordinary molding method such as injection molding, extrusion molding or press molding.

Further, the liquid crystalline polyester composition can be molded into a molded article with excellent surface appearance (color tone), mechanical properties, heat resistance and flame retardancy by an ordinary molding method such as injection molding, extrusion molding or press molding.

Examples of the molded article include injection-molded articles, extrusion-molded articles, press-molded articles, sheets, pipes, films, fibers, etc., and especially injection molded articles are preferred, since the effects such as flowability can be remarkably obtained.

The molded articles composed of the liquid crystalline polyester or the liquid crystalline polyester composition can be used, for example, as electric and electronic parts typified by various gears, various cases, sensors, LED lamps, connectors, sockets, resistors, relay cases, switches, coil bobbins, capacitors, variable capacitor cases, optical pickups, oscillators, various terminal boards, transformers, plugs, printed wiring boards, tuners, speakers, microphones, headphones, small motors, magnetic head bases, power modules, housings, semiconductors, liquid crystal display parts, FDD carriages, FDD chassis, HDD parts, motor brush holders, parabolic antennas and computer-related parts; VTR parts, television parts, irons, hair dryers, ricer cooker parts, electronic oven parts, audio device parts such as acoustic parts, audio, laser discs and compact discs, household and office electric appliance parts typified by illumination parts, refrigerator parts, air conditioner parts, typewriter parts and word processor parts, office computer-related parts, telephone set-related parts, facsimile-related parts, copier-related parts, machine-related parts typified by washing fixtures, various bearings such as oilless bearings, stem bearings and submerged bearings, motor parts, lighters and typewriters, optical apparatuses typified by microscopes, binoculars, cameras and time pieces, precision machine-related parts; automobile-/motor vehicle-related parts such as alternator terminals, alternator connectors, IC regulators, potentiometer bases for light dimmers, various valves such as exhaust gas valves, various pipes for fuel, exhaust and suction, air intake nozzle snorkels, intake manifolds, fuel pumps, engine cooling water joints, carburetor main bodies, carburetor spacers, exhaust gas sensors, cooling water sensors, oil temperature sensors, throttle, position sensors, crankshaft position sensors, air flow meters, brake pad wear sensors, thermostat bases for air conditioners, motor insulators for air conditioners, space heating hot air flow control valves, brush holders for radiator motors, water pump impellers, turbine vanes, wiper motor-related parts, distributors, starter switches, starter relays, wire harnesses for transmissions, window washer nozzles, air conditioner panel switch boards, fuel electromagnetic valve coils, fuse connectors, horn terminals, electric equipment part insulation boards, step motor rotors, lamp bezels, lamp sockets, lamp reflectors, lamp, housings, brake pistons, solenoid bobbins, engine oil filters and igniter cases. In the case where the liquid crystalline polyester is used as films, it can be used as magnetic recording medium films, photo films, capacitor films, electric insulation films, packaging films, drafting films and ribbon, films. In the case where the liquid crystalline polyester is used as sheets, it can be used as interior ceilings of automobiles, door trims, pads of instrument panels, cushioning materials of bumpers and side frames, sound absorbing pads for back surfaces of bonnets and seat materials. The liquid crystalline polyester can also be used as pillars, fuel tanks, brake hoses, window washer liquid nozzles, air conditioner refrigerant tubes, and peripheral parts thereof.

EXAMPLES

Our liquid crystalline polyesters and methods are described below in further detail in reference to examples.

Liquid Crystalline Polyesters (A)

Working Example 1

A 5-liter reactor equipped with stirring blades and a distillation pipe was charged with 724.5 g (3.85 moles) of 2-hydroxy-6-naphthoic acid, 478.6 g (2.57 moles) of 4,4'-dihydroxbiphenyl and 555.6 g (2.57 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and a reaction was performed with stirring in a nitrogen gas atmosphere at 145° C. for 2 hours, and subsequently the reaction mixture was heated up to 365° C. (this temperature was the highest temperature reached during melt polymerization; hereinafter this applies also to A-2 to A-24, B-1, C-1, C-2 and C-7 to C-10), taking 4 hours. Then, the reaction mixture was kept at 365° C. for 1.5 hours, and the pressure was reduced to 133 Pa, taking 1.0 hour. Further, the reaction was continued for 60 minutes, and when the torque reached 22 kg·cm, the polycondensation was completed. Then, the reactor was internally pressurized to 0.1 MPa, and the polymer was discharged through a die having one circular discharge hole with a diameter of 10 mm as a strand, being pelletized by a cutter.

The Tm (the melting point of a liquid crystalline polyester) of the liquid crystalline polyester (A-1) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,500.

Working Example 2

The same operation as described above for A-1 was performed except that the melt polymerization temperature was 370° C. and that the polycondensation was completed when the torque reached 20 kg·cm.

The Tm (the melting point of a liquid crystalline polyester) of the liquid crystalline polyester (A-2) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 3

The same operation as described above for A-1 was performed except that the melt polymerization temperature was 375° C. and that the polycondensation was completed when the torque reached 18 kg·cm.

The Tm (the melting point of a liquid crystalline polyester) of the liquid crystalline polyester (A-3) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 4

The same operation as described above for A-1 was performed except that the melt polymerization temperature was 380° C. and that the polycondensation was completed when the torque reached 18 kg·cm.

The Tm (the melting point of a liquid crystalline polyester) of the liquid crystalline polyester (A-4) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,400.

Working Example 5

The same operation as described above for A-1 was performed except that the melt polymerization temperature was 385° C. and that the polycondensation was completed when the torque reached 14 kg·cm.

The Tm (the melting point of a liquid crystalline polyester) of the liquid crystalline polyester (A-5) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,400.

Working Example 6

The same operation as described above for A-1 was performed, except that a 5-liter reactor equipped with stirring blades and a distillation pipe was charged with 677.4 g (3.60 moles) of 2-hydroxy-6-naphthoic acid, 502.8 g (2.70 moles) of 4,4'-dihydroxybiphenyl, 583.7 g (2.70 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and that the melt polymerization temperature was 375° C.

The Tm (the melting point of a liquid crystalline polyester) of the liquid crystalline polyester (A-6) was 348° C.

The melt, viscosity measured by a Koka type, flow tester (orifice 0.5 dia.×10 mm) at a temperature of 368° C. and at a shear rate of 1,000/s was 20 Pa·s. The number average molecular weight measured by GPC-LS (mixed solvent of pentafluorophenol/chloroform=50/50, 80° C.) was 12,400.

Working Example 7

The same operation as described above for A-1 was performed, except that a 5-liter reactor equipped with stirring blades and a distillation pipe was charged with 745.2 g (3.96 moles) of 2-hydroxy-6-naphthoic acid, 469.2 g (2.52 moles) of 4,4'-dihydroxybiphenyl, 544.8 g (2.52 moles) of 2,6-naphthalenedicarboxylic acid, 0.32 g (0.02 wt %) of sodium acetate and 1010.7 g (1.10 equivalents based on the amount of all the phenolic hydroxy groups of the system) of acetic anhydride, and that the melt polymerization temperature was 370° C.

The Tm (the melting point of a liquid crystalline polyester) of the liquid crystalline polyester (A-7) was 343° C.

The melt viscosity measured by a Koka type flow tester (orifice 0.5 dia.×10 mm) at a temperature of 363° C. and at a shear rate of 1,000/s was 20 Pa·s. The number average molecular weight measured by GPC-LS (mixed solvent of pentafluorophenol/chloroform=50/50, 80° C.) was 12,500.

Working Example 8

The same operation as described above for A-1 was performed, except that a 5-liter reactor equipped with stirring blade and a distillation pipe was charged with 643.6 g (3.42 moles) of 2-hydroxy-6-naphthoic acid, 519.5 g (2.79 moles) of 4,4'-dihydroxybisphenyl, 603.2 g (2.79 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and that the melt polymerization temperature was 375° C.

The Tm (the melting point of a liquid crystalline polyester) of the liquid crystalline polyester (A-8) was 350° C.

The melt viscosity measured by a Koka type flow tester (orifice 0.5 dia.×10 mm) at a temperature of 370° C. and at a shear rate of 1,000/s was 20 Pa·s. The number average molecular weight measured by GPC-LS (mixed solvent of pentafluorophenol/chloroform=50/50, 80° C.) was 12,800.

Working Example 9

The same operation as described above for A-1 was performed, except that, a 5-liter reactor equipped with stirring blades and a distillation pipe was charged with 816.7 g (4.34 moles) of 2-hydroxy-6-naphthoic acid, 433.9 g (2.33 moles) of 4,4'-dihydroxybiphenyl, 503.7 g, (2.33 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, that the melt polymerization temperature was 365° C., and that the polycondensation was completed when the torque reached 18 kg·cm.

The Tm (the melting point of a liquid crystalline polyester) of the liquid crystalline polyester (A-9) was 337° C.

The melt viscosity measured by a Koka type flow tester (orifice 0.5 dia.×10 mm) at a temperature of 357° C. and at a shear rate of 1,000/s was 20 Pa·s. The number average molecular weight measured by GPC-LS (mixed solvent of pentafluorophenol/chloroform=50/50, 80° C.) was 12,800.

Working Example 10

The same operation as described above for A-1 was performed, except that a 5-liter reactor equipped with stirring blades and a distillation pipe was charged with 816.7 g (4.34 moles) of 2-hydroxy-6-naphthoic acid, 433.9 g (2.33 moles) of 4,4'-dihydroxybiphenyl, 503.7 g (233 moles) of 2,6-naphthalenedicarboxylic acid and 1010.7 g (1.10 equivalents based on the amount of all the phenolic hydroxyl groups of the system) of acetic anhydride, that the melt polymerization temperature was 370° C., and that the polycondensation was completed when the torque reached 16 kg·cm.

The Tm (the melting point of a liquid crystalline polyester) of the liquid crystalline polyester (A-10) was 337° C.

The melt viscosity measured by a Koka type flow tester (orifice 0.5 dia.×10 mm) at a temperature of 357° C. and at a shear rate of 1,000/s was 20 Pa·s. The number average molecular weight measured by GPC-LS (mixed solvent of pentafluorophenol/chloroform=50/50, 80° C.) was 12,800.

Working Example 11

The same operation as described above for A-1 was performed, except that a 5-liter reactor equipped with stirring blades and a distillation pipe was charged with 846.8 g (4.50 moles) of 2-hydroxy-6-naphthoic acid, 419.0 g (2.25 moles) of 4,4'-dihydroxybiphenyl, 486.4 g (2.25 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and that the melt polymerization temperature was 360° C.

The Tm (the melting point of a liquid crystalline polyester) of the liquid crystalline polyester (A-11) was 334° C.

The melt viscosity measured by a Koka type flow tester (orifice 0.5 dia.×10 mm) at a temperature of 354° C. and at a shear rate of 1,000/s was 20 Pa·s. The number average molecular weight measured by GPC-LS (mixed solvent of pentafluorophenol/chloroform=50/50, 80° C.) was 12,400.

Working Example 12

The same operation as described above for A-1 was, performed, except that a 5-liter reactor equipped with stirring blades and a distillation pipe was charged with 931.5 g (4.95 moles) of 2-hydroxy-6-naphthoic acid, 378.0 g (2.03 moles) of 4,4'-dihydroxybiphenyl, 438.9 g (2.03 moles) of 2,6-naphthalenedicarboxylic acid, 0.32 g (0.02 wt %) of sodium acetate and 10103 g (1.10 equivalents based on the amount of all the phenolic hydroxyl groups of the system) of acetic anhydride, that the melt polymerization temperature was 355° C., and that the polycondensation was completed when the torque reached 18 kg·cm.

The Tm (the melting point of a liquid crystalline polyester) of the liquid crystalline polyester (A-12) was 326° C.

The melt viscosity measured by a Koka type flow tester (orifice 0.5 dia.×10 mm) at a temperature of 346° C. and at a shear rate of 1,000/s was 20 Pa·s. The number average molecular weight measured by GPC-LS (mixed solvent of pentafluorophenol/chloroform=50/50, 80° C.) was 12,400.

Working Example 13

The same operation as described above for A-1 was performed, except that a 5-liter reactor equipped with stirring blades and a distillation pipe was charged with 1016.2 g (5.40 moles) of 2-hydroxy-6-naphthoic acid, 335.2 g (1.80 moles) of 4,4'-dihydroxybiphenyl, 389.1 g (1.80 moles) of 2,6-napthalenedicarboxylic acid, 0.32 g (0.02 wt %) of sodium acetate and 1010.7 g (1.10 equivalents based on the amount of all the phenolic hydroxyl groups of the system) of acetic anhydride, and that the melt polymerization temperature was 345° C.

The Tm (the melting point of a liquid crystalline polyester) of the liquid crystalline polyester (A-13) was 319° C.

The melt viscosity measured by a Koka type flow tester (orifice 0.5 dia.×10 mm) at a temperature of 339° C. and at a shear, rate of 1,000/s was 20 Pa·s. The number average molecular weight measured by GPC-LS (mixed solvent of pentafluorophenol/chloroform=50/50, 80° C.) was 12,400.

Working Example 14

The same operation as described above for A-1 was performed, except that a 5-liter reactor equipped with stirring blades and a distillation pipe was charged with 1100.9 g (5.85 moles) of 2-hydroxy-6-naphthoic acid, 294.2 g (1.58 moles) of 4,4'-dihydroxybiphenyl, 341.6 g (1.58 moles) of 2,6-naphthalenedicarboxylic acid, 0.31 g (0.02 wt %) of sodium acetate and 1010.7 g (1.10 equivalents based on the amount of all the phenolic hydroxyl groups of the system) of acetic anhydride, and that the melt polymerization temperature was 345° C.

The Tm (the melting point of a liquid crystalline polyester) of the liquid crystalline polyester (A-14) was 318° C.

The melt viscosity measured by a Koka type flow tester (orifice 0.5 dia.×10 mm) at a temperature of 338° C. and at a shear rate of 1,000/s was 20 Pa·s. The number average molecular weight measured by GPC-LS (mixed solvent of pentafluorophenol/chloroform=50/50, 80° C.) was 12,400.

Working Example 15

The same operation as described above for A-2 was performed, except that depressurization was started immediately after the melt polymerization temperature was reached.

The Tm (the melting point of a liquid crystalline polyester) of the liquid crystalline polyester (A-15) was 345° C. The weight loss rate measured using a thermogravimetric apparatus after holding at 355° C. in nitrogen atmosphere for 120 minutes was 0.40 wt %.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 16

The same operation as described above for A-2 was performed, except that depressurization was started after holding at the temperature identical to the melt polymerization temperature for 0.8 hour subsequently to the arrival at the melt polymerization temperature.

The Tm (the melting point of a liquid crystalline polyester) of the liquid crystalline polyester (A-16) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 17

The same operation as described above for A-2 was performed, except that depressurization was started after holding at the temperature identical to the melt polymerization temperature for 1.0 hour subsequently to the arrival at the melt polymerization temperature.

The Tm (the melting point of a liquid crystalline polyester) of the liquid crystalline polyester (A-17) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 18

The same operation as described above for A-2 was performed, except that depressurization was started after holding at the temperature identical to the melt polymerization temperature for 2.8 hours subsequently to the arrival at the melt polymerization temperature.

The Tm (the melting point of a liquid crystalline polyester) of the liquid crystalline polyester (A-18) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured, by GPC-LS (mixed solvent of pentafluorophenol/chloroform=50/50, 80° C.) was 12,600.

Working Example 19

The same operation as described above for A-2 was performed, except that depressurization was started after holding at the temperature identical to the melt polymerization temperature for 3.2 hours subsequently to the arrival at the melt polymerization temperature.

The Tm (the melting point of a liquid crystalline polyester) of the liquid crystalline polyester (A-19) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 20

A 5-liter reactor equipped with stirring blades and a distillation pipe was charged with 724.5 g (3.85 moles) of 2-hydroxy-6-napthoic acid, 478.6 g (2.57 moles) of 4,4'-dihydroxybiphenyl, 627.4 (2.57 moles) of dimethyl 2,6-naphthalenedicarboxylate and 937.2 g (1.02 equivalents based on the amount of all the phenolic hydroxy groups of the system) of acetic anhydride, and a reaction was performed with stirring in a nitrogen gas atmosphere at 145° C. for 2 hours. Subsequently the reaction mixture was heated up to 370° C., taking 6 hours. When the amount, of acetic acid distilled away became more than 90% of the theoretical value, 0.27 g (0.02 wt %) of dibutyltin oxide was added, and the mixture was held at the same temperature for 1.5 hours, the pressure being reduced to 1.0 mm Hg (133 Pa), taking 1.0 hour. The reaction was continued for further 30 minutes, and when the torque reached 20 kg·cm, the polycondensation was completed. Then, the reactor was internally pressurized to 1.0 kg/cm$^2$ (0.1 MPa), and the polymer was discharged through a die having one circular discharge port with a diameter of 10 mm as a strand, being pelletized by a cutter.

The Tm (the melting point of a liquid crystalline polyester) of the liquid crystalline polyester (A-20) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 21

A 5-liter reactor equipped with stirring blades and a distillation pipe was charged with 724.5 g (3.85 moles) of 2-hydroxy-6-naphthoic acid, 478.6 g (2.57 moles) of 4,4'-dihydroxybiphenyl, 627.4 g (2.57 moles) of dimethyl 2,6-naphthalenedicarboxylate and 0.27 g (0.02 wt %) of dibutyltin oxide, and a reaction was performed with stirring in a nitrogen gas atmosphere at 145° C. for 2 hours. Subsequently the reaction mixture was heated to 370° C., taking 6 hours, and then held at 370° C. for 1.5 hours, the pressure being reduced to 1.0 mm Hg (133 Pa), taking 1.0 hour. The reaction was continued for further 30 minutes, and when the torque reached 20 kg·cm, the polycondensation was completed. Then, the reactor was internally pressurized to 1.0 kg/cm$^2$ (0.1 MPa), and the polymer was discharged through a die having one circular discharge port with a diameter of 10 mm as a strand, being pelletized by a cutter.

The Tm (the melting point of a liquid crystalline polyester) of the liquid crystalline polyester (A-21) was 345° C.

The melt viscosity measured by a Koka type flow tester (orifice 0.5 dia.×10 mm) at a temperature of 365° C. and at a shear rate of 1,000/s was 20 Pa·s. The number average molecular weight measured by GPC-LS (mixed solvent of pentafluorophenol/chloroform=50/50, 80° C.) was 12,600.

Working Example 22

The same operation as described above for A-2 was performed, except that 5-liter reactor equipped with stirring blades and a distillation pipe was charged with 717.0 g (3.81 moles) of 2-hydroxy-6-naphthoic acid, 478.6 g (2.57 moles) of 4,4'-dihydroxybiphenyl, 555.6 g (2.57 moles) of 2,6-naphthalenedicarboxylic acid, 12.4 g (0.05 mole) of 3,5-di-t-butyl-4-hydroxybenzoic acid, 0.32 g (0.02 wt %) of sodium acetate and 1010.7 g (1.10 equivalents based on the amount of all the phenolic hydroxyl groups of the system) of acetic anhydride.

The Tm (the melting point of a liquid crystalline polyester) of the liquid crystalline polyester (A-22) was 344° C.

The melt viscosity measured by a Koka type flow tester (orifice 0.5 dia.×10 mm) at a temperature of 364° C. and at a shear rate of 1,000/s was 20 Pa·s. The number average molecular weight measured by GPC-LS (mixed solvent of pentafluorophenol/chloroform=50/50, 80° C.) was 12,600.

Working Example 23

The same operated as described above for A-2 was performed, except that a 5-liter reactor equipped with stirring blades and a distillation pipe was charged with 696.3 g (3.70 moles) of 2-hydroxy-6-naphthoic acid, 478.6 g (2.57 moles) of 4,4'-dihydroxybiphenyl, 555.6 g (2.57 moles) of 2,6-naphthalenedicarboxylic acid, 37.2 g (0.15 mole) of 3,5-di-t-butyl-4-hydroxybenzoic acid, 0.32 g (0.02 wt %) of sodium acetate and 1010.7 g (1.10 equivalents based on the amount of all the phenolic hydroxyl groups of the system) of acetic anhydride.

The Tm (the melting point of a liquid crystalline polyester) of the liquid crystalline polyester (A-23) was 344° C.

The melt viscosity measured by a Koka type flow tester (orifice 0.5 dia.×10 mm) at a temperature of 364° C. and at a shear rate of 1,000/s was 20 Pa·s. The number average molecular weight measured by GPC-LS (mixed solvent of pentafluorophenol/chloroform=50/50, 80° C.) was 12,600.

Working Example 24

The same operation as described above for A-2 was performed, except that a 5-liter reactor equipped with stirring blades and a distillation pipe was charged, with 673.7 g (3.58 moles) of 2-hydroxy-6-naphthoic acid, 478.6 g (2.57 moles) of 4,4'-dihydroxybiphenyl, 555.6 g (2.57 moles) of 2,6-naphthalenedicarboxylic acid, 67.0 g (0.27 mole) of 3,5-d-t-butyl-4-hydroxybenzoic acid, 0.32 g (0.02 wt %) of sodium acetate and 1010.7 g (1.10 equivalents based on the amount of all the phenolic hydroxyl groups of the system) of acetic anhydride.

The Tm (the melting point of a liquid crystalline polyester) of the liquid crystalline polyester (A-24) was 339° C.

The melt viscosity measured by a Koka type flow tester (orifice 0.5 dia.×10 mm) at a temperature of 359° C. and at a shear rate of 1,000/s was 20 Pa·s. The number average molecular weight measured by GPC-LS (mixed solvent of pentafluorophenol/chloroform 50/50, 80° C.) was 12,600.

Liquid Crystalline Polyesters (C)

Comparative Example 1

The same operation as described above for A-1 was performed, except that the melt polymerization temperature was 360° C. and that the polycondensation was completed when the torque reached 22 kg·cm.

The Tm (the melting point of a liquid crystalline polyester) of the liquid crystalline polyester (C-1) was 345° C. The melt viscosity measured by a Koka type flow tester (orifice 0.5 dia.×10 mm) at a temperature of 365° C. and at a shear rate of 1,000/s was 24 Pa·s.

The number average molecular weight measured by GPC-LS (mixed solvent of pentafluorophenol/chloroform=50/50, 80° C.) was 12,600.

Comparative Example 2

The same operation as described above for A-1 was performed, except that the melt polymerization temperature was 390° C. and that the polycondensation was completed when the torque reached 14 kg·cm.

The Tm (the melting point of a liquid crystalline polyester) of the liquid crystalline polyester (C-2) was 345° C. The melt viscosity measured by a Koka type flow tester (orifice 0.5 dia.×10 mm) at a temperature of 365° C. and at a shear rate of 1,000/s was 24 Pa·s.

The number average molecular weight measured by GPC-LS (mixed solvent of pentafluorophenol/chloroform=50/50, 80° C.) was 12,600.

Comparative Example 3

A 5-liter reactor equipped with stirring blades and a distillation pipe was charged with 846.8 g (4.50 moles) of 2-hydroxy-6-naphthoic acid, 419.0 (2.25 moles) of 4,4'-dihydroxybiphenyl, 486.4 g (2.25 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and a reaction was performed with, stirring in a nitrogen gas atmosphere at 145° C. for 1 hour. Subsequently the reaction mixture was heated up to 310° C. (this temperature was the highest temperature reached during melt polymerization), taking 3 hours, and, held for 2.5 hours. The obtained polymer was ejected and ground by a grinder into a powder with a particle size of 0.1 to 1 mm. The powder was supplied into a plate solid-phase polymerization reactor and heated from 25° C. to 250° C. in a nitrogen stream (nitrogen flow rate 12 L/min), taking 1 hour, then being heated from the same temperature to 320° C., taking 8 hours and held for 5 hours, to perform a solid-phase polymerization.

The Tm (the melting point of a liquid crystalline polyester) of the liquid crystalline polyester (C-3) was 334° C.

The melt viscosity measured by a Koka type flow tester (orifice 0.5 dia.×10 mm) at a temperature of 354° C. and at a shear rate of 1,000/s was 21 Pa·s. The number average molecular weight measured by GPC-LS (mixed solvent of pentafluorophenol/chloroform=50/50, 80° C.) was 12,600.

Comparative Example 4

A 5-liter reactor equipped with stirring blades and a distillation pipe was charged with 890.1 g (4.73 moles) of 2-hydroxy-6-naphthoic acid, 396.6 g (2.13 moles) of 4,4'-dihydroxybiphenyl, 460.5 g (2.13 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and a reaction was performed with stirring in a nitrogen gas atmosphere at 145° C. for 1 hour. Subsequently the reaction mixture was heated up to 310° C. (this temperature was the highest temperature reached during melt polymerization), taking 3.5 hours, and held for 2 hours. The obtained polymer was ejected and ground by a grinder into a powder with a particle size of 0.1 to 1 mm. The powder was supplied into a plate solid-phase polymerization reactor and heated from 25° C. to 250° C. in a nitrogen stream (nitrogen flow rate 12 L/min), taking 1 hour, and then further heated from the same temperature to 325° C., taking 10 hours, and held for 12 hours, to perform a solid-phase polymerization.

The Tm (the melting point of a liquid crystalline polyester) of the liquid crystalline polyester (C-4) was 330° C.

The melt viscosity measured by a Koka type flow tester (orifice 0.5 dia.×10 mm) at a temperature of 350° C., and at a shear rate of 1,000/s was 21 Pa·s. The number average molecular weight measured by GPC-LS (mixed solvent of pentafluorophenol/chloroform=50/50, 80° C.) was 12,600.

Comparative Example 5

A 5-liter reactor equipped with stirring blades and, a distillation pipe was charged with 931.5 g (4.95 moles) 2-hydroxy-6-napthoic acid, 378.0 g (2.03 moles) of 4,4'-dihydroxybiphenyl, 438.9 g (2.03 moles) of 2,6-naphthalenedicarboxylic acid, 0.32 g (0.02 wt %) of sodium acetate and 1010.7 g (1.1 equivalents based on the amount of all the phenolic hydroxyl groups of the system) of acetic anhydride, and a reaction was performed with stirring in a nitrogen gas atmosphere at 145° C., taking 1 hour. Subsequently the reaction mixture was heated up to 310° C. (this temperature was the highest temperature reached during melt polymerization), taking 3.5 hours, and held for 2 hours. The obtained polymer was ejected and ground by a grinder into a powder with a particle size of 0.1 to 1 mm. The polymer was supplied into a place solid-phase polymerization reactor, and heated from 25° C. to 250° C. in a nitrogen steam (nitrogen flow rate 12 L/min), taking 1 hour, and further heated from the same temperature to 325° C., taking 10 hours, being held for 12 hours, to perform a solid-phase polymerization.

The Tm (the melting point of a liquid crystalline polyester) of the liquid crystalline polyester (C-5) was 326° C.

The melt viscosity measured by a Koka type flow tester (orifice 0.5 dia.×10 mm) at a temperature of 346° C. and at a shear rate of 1,000/s was 21 Pa·s. The number, average molecular weight measured by GPC-LS (mixed solvent of pentafluorophenol/chloroform=50/50, 80° C.) was 12,600.

Comparative Example 6

A 5-liter reactor equipped with stirring blades and a distillation pipe was charged with 724.5 g (3.85 moles) of 2-hydroxy-6-naphthoic acid, 478.6 g (2.57 moles) of 4,4'-dihydroxybiphenyl, 555.6 g (2.57 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and a reaction was performed with stirring in a nitrogen gas atmosphere at 145° C. for 2 hours. Subsequently the reaction mixture was heated up to 280° C., taking 2 hours, and held for 1 hour, then heated up to 310° C. (this temperature was the highest temperature reached during melt polymerization), taking 0.5 hour, and held for 2.5 hours. The obtained polymer was ejected and ground by a grinder into a powder with a particle size of 0.1 to 1 mm. The powder was supplied into a plate solid-phase polymerization reactor, and heated from 25° C. to 250° C. in a nitrogen stream (nitrogen flow rate 12 L/min), taking 1 hour, and further heated from the same temperature to 320° C., taking 8 hours, and held for 5 hours, to perform a solid-phase polymerization.

The Tm (the melting point of a liquid crystalline polyester) of the liquid crystalline polyester (C-6) was 345° C.

The melt viscosity measured by a Koka type flow tester (orifice 0.5 dia.×10 mm) at a temperature of 365° C. and at a shear rate of 1,000/s was 21 Pa·s. The number average molecular weight measured by GPC-LS (mixed solvent of pentafluorophenol/chloroform=50/50, 80° C.) was 12,600.

Comparative Example 7

The same operation as described above for A-1 was performed, except that a 5-liter reactor equipped with stirring blades and a distillation pipe was charged with 566.4 g (3.01 moles) of 2-hydroxy-6-naphthoic acid, 558.6 g (3.00 moles) of 4,4'-dihydroxybiphenyl, 648.6 g (3.00 moles) of 2,6-naphthalenedicarboxylic acid, 0.32 g (0.02 wt %) of sodium acetate and 1010.7 g (1.10 equivalents based on the amount of all the phenolic hydroxyl groups of the system) of acetic anhydride, and that the melt polymerization temperature was 380° C.

The Tm (the melting point of a liquid crystalline polyester) of the liquid crystalline polyester (C-7) was 355° C.

The melt viscosity measured by a Koka type flow tester (orifice 0.5 dia.×10 mm) at a temperature of 375° C. and at a shear rate of 1,000/s was 21 Pa·s. The number average molecular weight measured by GPC-LS (mixed solvent of pentafluorophenol/chloroform=50/50, 80° C.) was 12,600.

Comparative Example 8

The same operation as described above for C-7 was performed, except that the melt polymerization temperature was 370° C. and that the polycondensation was completed when the torque reached 24 kg·cm.

The Tm (the melting point of a liquid crystalline polyester) of the liquid crystalline polyester (C-8) was 355° C.

The melt viscosity measured by a Koka type flow tester (orifice 0.5 dia.×10 mm) at a temperature of 375° C. and at a shear rate of 1,000/s was 21 Pa·s. The number average molecular weight measured by GPC-LS (mixed solvent of pentafluorophenol/chloroform=50/50, 80° C.) was 12,600.

Comparative Example 9

The same operation as described above for A-1 was performed, except that a 5-liter reactor equipped with stirring blades and a distillation pipe was charged with 1,385.0 g (7.36 moles) of 2-hydroxy-6-napthoic acid, 152.7 g (0.82 mole) of 4,4'-dihydroxybiphenyl, 177.3 g (0.82 mole) of 2,6-naphthalenedicarboxylic acid, 0.31 g (0.02 wt %) of sodium acetate and 1010.7 g (1.10 equivalents based on the amount of all the phenolic hydroxyl groups of the system) of acetic anhydride, and that the melt polymerization temperature was 330° C.

The Tm (the melting point of a liquid crystalline polyester) of the liquid crystalline polyester (C-9) was 300° C.

The melt viscosity measured by a Koka type flow tester (orifice 0.5 dia.×1.0 mm) at a temperature of 320° C. and at a shear rate of 1,000/s was 21. Pa·s. The number average molecular weight measured by GPC-LS (mixed solvent of pentafluorophenol/chloroform=50/50, 80° C.) was 12,600.

Comparative Example 10

The same operation as described above for C-9 was performed, except that a 5-liter reactor equipped with stirring blades and a distillation pipe was charged with 1,385.0 g (7.36 moles) of 2-hydroxy-6-naphthoic acid, 152.7 g (0.82 mole) of 4,4'-dihydroxybiphenyl, 177.3 g (0.82 mole) of 2,6-naphthalenedicarboxylic acid, 0.31 g (0.02 wt %) of sodium acetate, and 1010.7 g (1.10 equivalents based on the amount of all the phenolic hydroxyl groups of the system) of acetic anhydride, that the melt polymerization temperature was 310° C., and that the polycondensation was completed when the torque reached 26 kg·cm. The Tm (the melting point of a liquid crystalline polyester) of the liquid crystalline polyester (C-10) was 300° C. The melt viscosity measured by a Koka type flow tester (orifice 0.5 dia.×10 mm) at a temperature of 320° C. and at a shear rate of 1,000/s was 21 Pa·s. The number average molecular weight measured by GPC-LS (mixed solvent of pentafluorophenol/chloroform=50/50, 80° C.) was 12,600.

Meanwhile, the liquid crystalline polyesters (C) described above as comparative examples are liquid crystalline polyesters which do not comply in the chemical composition range and/or, in the average sequence range of the structural units obtained from 2-hydroxy-6-naphthoic acid.

Evaluation was performed according to the following methods (1) to (10).

(1) Average Sequence Length of the Structural Units Obtained from 2-hydroxy-6-napthoic acid A liquid crystalline polyester was dissolved into a mixed solvent of pentafluorophenol/deuterated chloroform=50/50, to achieve 10 mg/mL, and 500 MHz-NMR produced by JEOL was used to measure $^{13}$C-NMR.

In reference to the spectral peaks obtained, the shifting of the carbon at the 2-position of a structural unit obtained from 2-hydroxy-6-naphthoic acid separated the structure linked to the 6-position of another structural unit obtained from 2-hydroxy-6-naphthoic acid via an ester linkage (peak A: 151.0 ppm) from the structure linked to 2,6-naphthalenedicarboxylic acid (peak B: 151.7 ppm). From the respective peak areas (integral values) (peak A area (a) and peak B area (b)), the average sequence length of the structural units, obtained from 2-hydroxy-6-naphthoic acid was calculated using the following formula. A peak area (integral value) may also be called a peak intensity ratio. (Average sequence length of structural units obtained from 2-hydroxy-6-naphthoic acid)=a/b (2) Whether or not Methoxycarbonyl Group Ends or Hydroxyl Group Ends Exist A liquid crystalline polyester was dissolved into a mixed solvent of pentafluorophenol/deuterated chloroform=50/50, to achieve 10 mg/L, and $^1$H nucleus-NMR was measured using 500 MHz-NMR produced by JEOL.

In the case where the peak obtained from the methoxycarbonyl group was observed near 4.0 ppm in the obtained spectrum, it was decided that methoxycarbonyl group ends existed, and in the case where the peak was not observed, it was decided that methoxycarbonyl group ends did not exist. Likewise, with regard to hydroxyl groups, in reference to the peak attributable to the protons of the β-position carbon for the phenolic hydroxyl group end of the structural unit obtained from 4,4'-dihydroxybiphenyl near 6.8 ppm and the peak attributable to the protons of the 2-position carbon for the phenolic hydroxyl group end of the structural unit, obtained from 2-hydroxy-6-napthoic acid near 7.25 ppm, whether or not hydroxyl group ends existed was decided.

(3) Melting Point

The melting point (Tm) refers to the endothermic peak temperature (Tm2) observed in the process of the differential scanning calorimetry of observing the endothermic peak temperature (Tm1) while heating a polymer produced by polymerization from room temperature at a heating rate of 20° C./min, holding at a temperature of Tm1+20° C. for 5 minutes, once cooling to room temperature at a cooling rate of 20° C./min, and heating again at a heating rate of 20° C./min, using the differential scanning calorimeter DSC7 produced by Perkin Elmer. In the case where multiple endothermic peak temperatures (Tm2) are observed, the peak on the higher temperature side should be used as the melting point.

(4) Anisotropy

Roboshot α30C electric injection molding machine produced by Fanuc was used at a cylinder temperature of the melting point Tm of the liquid crystalline polyester+20° C. and at a mold temperature of 80° C., to mold a 70 mm wide×70 mm long×2, mm thick square plate, and the molding shrinkage rate of the square plate in the flow direction (machine direction=MD) and the molding shrinkage rate in the direction perpendicular to the flow direction (transverse direction=TD) were measured. The ratio of molding shrinkage rates=|Molding shrinkage rate in the flow direction (MD)|/|Molding shrinkage rate in the perpendicular direction (TD)|, was obtained to evaluate the anisotropy. If the value obtained from the abovementioned formula is smaller, the anisotropy is smaller.

(5) Dielectric Breakdown Resistance

The dielectric breakdown resistance was measured using the above-mentioned square plate according to JIS C 2110 (1994). As the lower electrode, a 10 cm square aluminum foil electrode with a thickness of 100 μm was used, and as the upper electrode, an electrode with a diameter of 8 mm made from brass was used. The square plate was held between the electrodes, and a stabilized high voltage DC power supply produced by Kasuga Electric Works Ltd. was used to apply a voltage while raising the voltage at a constant rate till dielectric breakdown occurred. The voltage at which dielectric breakdown occurred is called the dielectric breakdown voltage. The mean value of 10 measurement results was employed as the dielectric breakdown voltage. A larger dielectric breakdown voltage value shows more excellent dielectric breakdown resistance.

(6) Flowability

The abovementioned, molding machine was used at a cylinder temperature of the melting point Tm of the liquid crystalline polyester+20° C. and at a mold temperature of 80° C., to mold specimens at an injection speed of 300 m/s and at three injection pressures of 50, 70 and 90 MPa using a 12.7 mm wide×0.3 mm thick rod flowable length mold. The lengths (flowable lengths) of the obtained molded articles were measured. From the relationship between the injection pressure at the time of molding and the flowable length of each of the three molded articles, the flowable length at an injection pressure of 10 MPa was calculated and employed as an indicator of flowability. A longer flowable length shows more excellent flowability.

(7) Toughness

The abovementioned molding machine was used to mold 3.2 mm thick×12.7 mm wide×127 mm long specimens, and, the bending deflection was measured according to ASTM D790.

(8) Heat Resistance

The abovementioned molding machine was used to mold 12.7 mm wide×50 mm long×0.5 mm thick specimens, and the specimens were measured at a load of 1.82 MPa according to ASTM D648. The temperature at which a constant strain occurred under a constant load was measured as the deflection temperature under load. The difference between the melting point and the deflection temperature under load was used as the indictor of heat resistance. A smaller difference shows higher heat resistance.

(9) Self-Gasification Rate

The thermogravimetric apparatus TGA7 produced by Perkin Elmer was used to evaluate the weight loss rate of a liquid crystalline polyester after the liquid crystalline polyester was held at the melting point +10° C. in nitrogen atmosphere for 120 minutes. A lower weight loss rate shows lower self-gasification capability.

(10) Small Bumping of Polymerization Reaction System

A liquid crystalline polyester was produced by polymerization in a glass test tube, to observe the reaction for evaluating the small bumping of the system. A case where the leak of the system into a distillation pipe due to the bubbling by bumping during the polymerization reaction was indicated by a cross, and a case where the rise in the liquid level of the system was observed was indicated by a triangle. A case where neither the bubbling nor the rise in the liquid level of the system occurred, was indicated by a circle.

TABLE 1

|  | Liquid crystalline polyester (A) | HNA (mol %) | DHB (mol %) | NDA (mol %) | t-BuHBA (mol %) | HNA/t-BuHBA (mol %) | Average sequence length of 2-hydroxy-6-naphthoic acid structure |
|---|---|---|---|---|---|---|---|
| Working Example 1 | A-1 | 42.8 | 28.6 | 28.6 | — | 100/0 | 0.9 |
| Working Example 2 | A-2 | 42.8 | 28.6 | 28.6 | — | 100/0 | 0.4 |
| Working Example 3 | A-3 | 42.8 | 28.6 | 28.6 | — | 100/0 | 0.5 |
| Working Example 4 | A-4 | 42.8 | 28.6 | 28.6 | — | 100/0 | 0.4 |
| Working Example 5 | A-5 | 42.8 | 28.6 | 28.6 | — | 100/0 | 0.1 |
| Working Example 6 | A-6 | 40 | 30 | 30 | — | 100/0 | 0.6 |

TABLE 1-continued

| Liquid crystalline polyester (A) | | HNA (mol %) | DHB (mol %) | NDA (mol %) | t-BuHBA (mol %) | HNA/t-BuHBA (mol %) | Average sequence length of 2-hydroxy-6-naphthoic acid structure |
|---|---|---|---|---|---|---|---|
| Working Example 7 | A-7 | 44 | 28 | 28 | — | 100/0 | 0.7 |
| Working Example 8 | A-8 | 38 | 31 | 31 | — | 100/0 | 0.8 |
| Working Example 9 | A-9 | 48.2 | 25.9 | 25.9 | — | 100/0 | 0.6 |
| Working Example 10 | A-10 | 48.2 | 25.9 | 25.9 | — | 100/0 | 0.6 |
| Working Example 11 | A-11 | 50 | 25 | 25 | — | 100/0 | 0.8 |
| Working Example 12 | A-12 | 55 | 22.5 | 22.5 | — | 100/0 | 0.8 |
| Working Example 13 | A-13 | 60 | 20 | 20 | — | 100/0 | 0.9 |
| Working Example 14 | A-14 | 65 | 15 | 15 | — | 100/0 | 0.9 |
| Working Example 22 | A-22 | 42.3 | 28.6 | 28.6 | 0.5 | 98.8/1.2 | 0.5 |
| Working Example 23 | A-23 | 41.1 | 28.6 | 28.6 | 1.7 | 96/4 | 0.5 |
| Working Example 24 | A-24 | 39.8 | 28.6 | 28.6 | 3 | 93/7 | 0.4 |

HNA = 2-hydroxy-6-naphthoic acid
DBH = 4,4'-dihydroxybiphenyl
NDA = 2,6-naphthalenedicarboxylic acid
t-BuHBA = 3,5-di-t-butyl-4-hydroxybenzoic acid

TABLE 2

| | Liquid crystalline polyester | Production process | Melting Point (° C.) ① | The highest temperature reached (° C.) (Note 1) ② | Difference from melting point (° C.) ② − ① | Residence time at the highest temperature reached (hours) | Whether or not bumping occurred | a (Note 2) | b (Note 3) | Average sequence length of 2-hydroxy-6-naphtoic acid structure |
|---|---|---|---|---|---|---|---|---|---|---|
| Working Example 1 | A-1 | Melt polymerization | 345 | 365 | 20 | 1.5 | Δ | 0.48 | 0.52 | 0.9 |
| Working Example 2 | A-2 | Melt polymerization | 345 | 370 | 25 | 1.5 | Δ | 0.29 | 0.71 | 0.4 |
| Working Example 3 | A-3 | Melt polymerization | 345 | 375 | 30 | 1.5 | Δ | 0.34 | 0.66 | 0.5 |
| Working Example 4 | A-4 | Melt polymerization | 345 | 380 | 35 | 1.5 | Δ | 0.29 | 0.71 | 0.4 |
| Working Example 5 | A-5 | Melt polymerization | 345 | 385 | 40 | 1.5 | Δ | 0.1 | 0.9 | 0.1 |
| Working Example 6 | A-6 | Melt polymerization | 348 | 375 | 27 | 1.5 | Δ | 0.38 | 0.62 | 0.6 |
| Working Example 7 | A-7 | Melt polymerization | 343 | 370 | 27 | 1.5 | Δ | 0.41 | 0.59 | 0.7 |
| Working Example 8 | A-8 | Melt polymerization | 350 | 375 | 25 | 1.5 | Δ | 0.45 | 0.55 | 0.8 |
| Working Example 9 | A-9 | Melt polymerization | 337 | 365 | 28 | 1.5 | Δ | 0.38 | 0.62 | 0.6 |
| Working Example 10 | A-10 | Melt polymerization | 337 | 370 | 33 | 1.5 | Δ | 0.38 | 0.62 | 0.6 |
| Working Example 11 | A-11 | Melt polymerization | 334 | 360 | 26 | 1.5 | Δ | 0.45 | 0.55 | 0.8 |
| Working Example 12 | A-12 | Melt polymerization | 326 | 355 | 29 | 1.5 | Δ | 0.45 | 0.55 | 0.8 |
| Working Example 13 | A-13 | Melt polymerization | 319 | 345 | 26 | 1.5 | Δ | 0.48 | 0.52 | 0.9 |
| Working Example 14 | A-14 | Melt polymerization | 318 | 345 | 27 | 1.5 | Δ | 0.48 | 0.52 | 0.9 |
| Working Example 22 | A-22 | Melt polymerization | 344 | 370 | 26 | 1.5 | ○ | 0.34 | 0.66 | 0.5 |
| Working Example 23 | A-23 | Melt polymerization | 344 | 370 | 26 | 1.5 | ○ | 0.34 | 0.66 | 0.5 |
| Working Example 24 | A-24 | Melt polymerization | 339 | 370 | 31 | 1.5 | ○ | 0.29 | 0.71 | 0.4 |

(Note 1): The highest temperature reached during melt polymerization
(Note 2): Peak intensity ratio of 151 ppm in $^{13}$C-NMR chart
(Note 3): Peak intensity ratio of 151.7 ppm in $^{13}$C-NMR chart

TABLE 3

| | Liquid crystalline polyester (A) | HNA (mol %) | DHB (mol %) | NDA (mol %) | NDCM (mol %) | t-BuHBA (mol %) | HNA/t-BuHBA (mol %) | Average sequence length of 2-hydroxy-6-naphthoic acid structure |
|---|---|---|---|---|---|---|---|---|
| Comparative Example 1 | C-1 | 42.8 | 28.6 | 28.6 | — | — | 100/0 | 2.2 |
| Comparative Example 2 | C-2 | 42.8 | 28.6 | 28.6 | — | — | 100/0 | 2.1 |
| Comparative Example 3 | C-3 | 50 | 25 | 25 | — | — | 100/0 | 2.4 |
| Comparative Example 4 | C-4 | 52.6 | 23.7 | 23.7 | — | — | 100/0 | 2.4 |
| Comparative Example 5 | C-5 | 55 | 22.5 | 22.5 | — | — | 100/0 | 2.4 |
| Comparative Example 6 | C-6 | 42.8 | 28.6 | 28.6 | — | — | 100/0 | 2.1 |
| Comparative Example 7 | C-7 | 33.4 | 33.3 | 33.3 | — | — | 100/0 | 0.4 |
| Comparative Example 8 | C-8 | 33.4 | 33.3 | 33.3 | — | — | 100/0 | 2.6 |
| Comparative Example 9 | C-9 | 81.8 | 9.1 | 9.1 | — | — | 100/0 | 4.3 |
| Comparative Example 10 | C-10 | 81.8 | 9.1 | 9.1 | — | — | 100/0 | 5.3 |

HNA = 2-hydroxy-6-naphthoic acid
DBH = 4,4'-dihydroxybiphenyl
NDA = 2,6-naphthalenedicarboxylic acid
NDCM = Dimethyl 2,6-naphthalenedicarboxylate
t-BuHBA = 3,5-di-t-butyl-4-hydroxybenzoic acid

TABLE 4

| | Liquid crystalline polyester (C) | Production process | Polycondensation method | Whether or not methoxycarbonyl group/ hydroxyl group ends exist | Melting point (° C.) ① | The highest temperature reached (° C.) (Note 1) ② | Difference from melting point (° C.) ② − ① | Residence time at the highest temperature reached (hours) | Whether or not bumping occurred | a (Note 2) | b (Note 3) | Average sequence length of 2-hydroxy-6-naphtoic acid structure |
|---|---|---|---|---|---|---|---|---|---|---|---|---|
| Comparative Example 1 | C-1 | Melt polymerization | De-acetic acid | No/No | 345 | 360 | 15 | 1.5 | x | 0.69 | 0.31 | 2.2 |
| Comparative Example 2 | C-2 | Melt polymerization | De-acetic acid | No/No | 345 | 390 | 45 | 1.5 | x | 0.68 | 0.32 | 2.1 |
| Comparative Example 3 | C-3 | Solid-phase polymerization | De-acetic acid | No/No | 334 | 310 | −24 | 2.5 | x | 0.71 | 0.29 | 2.4 |
| Comparative Example 4 | C-4 | Solid-phase polymerization | De-acetic acid | No/No | 330 | 310 | −20 | 2 | x | 0.71 | 0.29 | 2.4 |
| Comparative Example 5 | C-5 | Solid-phase polymerization | De-acetic acid | No/No | 326 | 310 | −16 | 2 | x | 0.71 | 0.29 | 2.4 |
| Comparative Example 6 | C-6 | Solid-phase polymerization | De-acetic acid | No/No | 345 | 310 | −35 | 2.5 | x | 0.68 | 0.32 | 2.1 |
| Comparative Example 7 | C-7 | Melt polymerization | De-acetic acid | No/No | 355 | 380 | 25 | 1.5 | Δ | 0.29 | 0.71 | 0.4 |
| Comparative Example 8 | C-8 | Melt polymerization | De-acetic acid | No/No | 355 | 370 | 15 | 1.5 | x | 0.72 | 0.28 | 2.6 |
| Comparative Example 9 | C-9 | Melt polymerization | De-acetic acid | No/No | 300 | 330 | 30 | 1.5 | Δ | 0.81 | 0.19 | 4.3 |
| Comparative Example 10 | C-10 | Melt polymerization | De-acetic acid | No/No | 300 | 310 | 10 | 1.5 | x | 0.84 | 0.16 | 5.3 |

(Note 1): The highest temperature reached during melt polymerization
(Note 2): Peak intensity ratio of 151 ppm in $^{13}$C-NMR chart
(Note 3): Peak intensity ratio of 151.7 ppm in $^{13}$C-NMR chart

TABLE 5

| | Liquid crystalline polyester (A) | HNA (mol %) | DHB (mol %) | NDA (mol %) |
|---|---|---|---|---|
| Working Example 2 | A-2 | 42.8 | 28.6 | 28.6 |
| Working Example 15 | A-15 | 42.8 | 28.6 | 28.6 |
| Working Example 16 | A-16 | 42.8 | 28.6 | 28.6 |
| Working Example 17 | A-17 | 42.8 | 28.6 | 28.6 |
| Working Example 18 | A-18 | 42.8 | 28.6 | 28.6 |
| Working Example 19 | A-19 | 42.8 | 28.6 | 28.6 |

| | Liquid crystalline polyester (A) | Production process | Melting point (° C.) ① | The highest temperature reached (° C.) (Note 1) ② | Difference from melting point (° C.) ② − ① | Residence time at the highest temperature reached (hours) | Whether or not bumping occurred | a (Note 2) | b (Note 3) | Average sequence length of 2-hydroxy-6-naphtoic acid structure |
|---|---|---|---|---|---|---|---|---|---|---|
| Working Example 2 | A-2 | Melt polymerization | 345 | 370 | 25 | 1.5 | Δ | 0.29 | 0.71 | 0.4 |
| Working Example 15 | A-15 | Melt polymerization | 345 | 370 | 25 | 0 | Δ | 0.48 | 0.52 | 0.9 |
| Working Example 16 | A-16 | Melt polymerization | 345 | 370 | 25 | 0.8 | Δ | 0.45 | 0.55 | 0.8 |
| Working Example 17 | A-17 | Melt polymerization | 345 | 370 | 25 | 1 | Δ | 0.34 | 0.66 | 0.5 |
| Working Example 18 | A-18 | Melt polymerization | 345 | 370 | 25 | 2.8 | Δ | 0.29 | 0.71 | 0.4 |
| Working Example 19 | A-19 | Melt polymerization | 345 | 370 | 25 | 3.2 | Δ | 0.1 | 0.9 | 0.1 |

HNA = 2-hydroxy-6-naphthoic acid
DBH = 4,4'-dihydroxybiphenyl
NDA = 2,6-naphthalenedicarboxylic acid
(Note 1): The highest temperature reached during melt polymerization
(Note 2): Peak intensity ratio of 151 ppm in $^{13}$C-NMR chart
(Note 3): Peak intensity ratio of 151.7 ppm in $^{13}$C-NMR chart

TABLE 6

| Liquid crystalline polyester (A) | | HNA (mol %) | DHB (mol %) | NDA (mol %) | NDCM (mol %) |
|---|---|---|---|---|---|
| Working Example 2 | A-2 | 42.8 | 28.6 | 28.6 | — |
| Working Example 20 | A-20 | 42.8 | 28.6 | — | 28.6 |
| Working Example 21 | A-21 | 42.8 | 28.6 | — | 28.6 |

| | Liquid crystalline polyester (A) | Production process | Polycondensation method | Whether or not methoxy-carbonyl group/ hydroxyl group ends exist | Melting point (° C.) ① | The highest temperature reached (° C.) (Note 1) ② | Difference from melting point (° C.) ② − ① | Residence time at the highest temperature reached (hours) | Whether or not bumping occurred | a (Note 2) | b (Note 3) | Average sequence length of 2-hydroxy-6-naphtoic acid structure |
|---|---|---|---|---|---|---|---|---|---|---|---|---|
| Working Example 2 | A-2 | Melt polymerization | De-acetic acid | No/No | 345 | 370 | 25 | 1.5 | Δ | 0.29 | 0.71 | 0.4 |
| Working Example 20 | A-20 | Melt polymerization | De-acetic acid + de-methyl acetate | Yes/No | 345 | 370 | 25 | 1.5 | ○ | 0.34 | 0.66 | 0.5 |
| Working Example 21 | A-21 | Melt polymerization | De-acetic acid + de-methanol | Yes/Yes | 345 | 370 | 25 | 1.5 | ○ | 0.34 | 0.66 | 0.5 |

HNA = 2-hydroxy-6-naphthoic acid
DBH = 4,4'-dihydroxybiphenyl
NDA = 2,6-naphthalenedicarboxylic acid
NDCM = Dimethyl 2,6-naphthalenedicarboxylate
(Note 1): The highest temperature reached during melt polymerization
(Note 2): Peak intensity ratio of 151 ppm in $^{13}$C-NMR chart
(Note 3): Peak intensity ratio of 151.7 ppm in $^{13}$C-NMR chart

TABLE 7

| | Liquid crystalline polyester (A) | Average sequence length of 2-hydroxy-6-naphtoic acid structure | Anisotropy (\|MD/\|TD\|) | Dielectric breakdown voltage (kV) | Flowable length (mm) | Deflection (mm) | Melting point - Deflection temperature under load (° C.) | Self-gasification rate (wt %) |
|---|---|---|---|---|---|---|---|---|
| Working Example 1 | A-1 | 0.9 | 4.2 | 52 | 79 | 7.6 | 38 | 0.2 |
| Working Example 2 | A-2 | 0.4 | 3.1 | 62 | 87 | 8.8 | 35 | 0.13 |
| Working Example 3 | A-3 | 0.5 | 3 | 61 | 86 | 8.8 | 35 | 0.13 |
| Working Example 4 | A-4 | 0.4 | 3 | 62 | 86 | 8.7 | 35 | 0.13 |
| Working Example 5 | A-5 | 0.1 | 3.8 | 52 | 80 | 7.7 | 38 | 0.2 |
| Working Example 6 | A-6 | 0.6 | 3 | 55 | 83 | 8.4 | 40 | 0.17 |
| Working Example 7 | A-7 | 0.7 | 3 | 54.5 | 83 | 8.3 | 40 | 0.16 |
| Working Example 8 | A-8 | 0.8 | 4.2 | 49.9 | 79 | 7.5 | 40 | 0.2 |
| Working Example 9 | A-9 | 0.6 | 4.2 | 49.9 | 80 | 7.5 | 41 | 0.2 |
| Working Example 10 | A-10 | 0.6 | 5 | 50.1 | 80 | 7.7 | 41 | 0.2 |
| Working Example 11 | A-11 | 0.8 | 4.3 | 49.5 | 75 | 7.4 | 40 | 0.21 |
| Working Example 12 | A-12 | 0.8 | 4.4 | 48.4 | 73 | 7.2 | 41 | 0.23 |
| Working Example 13 | A-13 | 0.9 | 4.4 | 47.3 | 71 | 6.9 | 42 | 0.23 |
| Working Example 14 | A-14 | 0.9 | 4.3 | 47.4 | 64 | 6.5 | 43 | 0.25 |
| Working Example 15 | A-15 | 0.9 | 5.3 | 48.9 | 71 | 7 | 45 | 0.27 |
| Working Example 16 | A-16 | 0.8 | 5.1 | 49.6 | 76 | 7.3 | 45 | 0.2 |
| Working Example 17 | A-17 | 0.5 | 3.4 | 58.4 | 87 | 8.5 | 38 | 0.15 |
| Working Example 18 | A-18 | 0.4 | 3.4 | 58.7 | 86 | 8.5 | 38 | 0.15 |
| Working Example 19 | A-19 | 0.1 | 5.1 | 46 | 70 | 7.1 | 45 | 0.29 |

TABLE 8

|  | Liquid crystalline polyester (C) | Average sequence length of 2-hydroxy-6-naphtoic acid structure | Anisotropy (\|MD/\|TD\|) | Dielectric breakdown voltage (kV) | Flowable length (mm) | Deflection (mm) | Melting point - Deflection temperature under load (° C.) | Self-gasification rate (wt %) |
|---|---|---|---|---|---|---|---|---|
| Comparative Example 1 | C-1 | 2.2 | 8.1 | 40 | 48 | 4.1 | 59 | 0.6 |
| Comparative Example 2 | C-2 | 2.1 | 13.5 | 15 | 40 | 1.2 | 65 | 0.82 |
| Comparative Example 3 | C-3 | 2.4 | 10.1 | 35.5 | 48 | 3.6 | 63 | 0.71 |
| Comparative Example 4 | C-4 | 2.4 | 9.2 | 37.7 | 45 | 3.7 | 62 | 0.68 |
| Comparative Example 5 | C-5 | 2.4 | 8.8 | 39.2 | 44 | 3.9 | 66 | 0.68 |
| Comparative Example 6 | C-6 | 2.1 | 7.4 | 29.7 | 52 | 4 | 67 | 0.68 |
| Comparative Example 7 | C-7 | 0.4 | 9 | 32 | 54 | 3.6 | 65 | 0.65 |
| Comparative Example 8 | C-8 | 2.6 | 11.9 | 24.6 | 39 | 3.3 | 65 | 0.69 |
| Comparative Example 9 | C-9 | 4.3 | 9.1 | 32.7 | 53 | 3.9 | 65 | 0.57 |
| Comparative Example | C-10 | 5.3 | 12.1 | 24.2 | 33 | 3.4 | 65 | 0.73 |

TABLE 9

|  | Liquid crystalline polyester (A) | Average sequence length of 2-hydroxy-6-naphtoic acid structure | Whether or not methoxycarbonyl group/hydroxyl group ends exist | Anisotropy (\|MD/\|TD\|) | Dielectric breakdown voltage (kV) | Flowable length (mm) | Deflection (mm) | Melting point - Deflection temperature under load (° C.) | Self-gasification rate (wt %) |
|---|---|---|---|---|---|---|---|---|---|
| Working Example 1 | A-2 | 0.4 | No/No | 3.1 | 62 | 87 | 8.8 | 35 | 0.13 |
| Working Example 20 | A-21 | 0.5 | No/No | 2.9 | 58.8 | 88 | 8.8 | 35 | 0.07 |
| Working Example 21 | A-22 | 0.5 | Yes/Yes | 2.9 | 58.5 | 88 | 8.7 | 35 | 0.03 |
| Working Example 22 | A-23 | 0.5 | No/No | 2.2 | 58.3 | 80 | 7.6 | 40 | 0.13 |
| Working Example 23 | A-24 | 0.5 | No/No | 2 | 58.3 | 81 | 7.6 | 40 | 0.13 |
| Working Example 24 | A-25 | 0.4 | No/No | 2 | 58.1 | 80 | 7.5 | 44 | 0.13 |

Comparing Working Examples 1 to 5 of Tables 1 and 2 with Comparative Examples 1 and 2 of Tables 3 and 4, it can be seen that in the production of our liquid crystalline polyester, if the highest temperature reached during melt polymerization is (the melting point of the obtained polymer +20° C.) to (the melting point +40° C.), the average sequence length of the structural units obtained from 2-hydroxy-6-naphthoic acid is controlled in a range from 0.1 to 1.

Comparing Working Examples 1 to 5 of Tables 1 and 2 with Comparative Examples 3 to 6 of Tables 3 and 4, it is clearly preferred that melt polymerization, not solid-phase polymerization, is performed, in the abovementioned temperature range to control the average sequence length of the structural units obtained from 2-hydroxy-6-naphthoic acid in a range from 0.1 to 1.

Further, from Working Examples 22 to 24 of Tables 1 and 2, it can be seen that if 3,5-t-butyl-4-hydroxybenzoic acid is contained as structural units of the liquid crystalline polyester, the effect of inhibiting the bumping of the reaction system occurring during production can be obtained.

From the comparison of Working Examples 2 and 15 to 19 of Table 5, it can be seen that when the residence time at the highest temperature reached during polymerization is 1 to 3 hours, the average sequence length of the structural units obtained from 2-hydroxy-6-naphthoic acid can be easily controlled in a range from 0.2 to 0.8.

From Working Examples 2, 20 and 21 of Table 6, if de-acetic acid polycondensation and de-methyl acetate polycondensation, or de-acetic acid polycondensation and de-methanol polycondensation are selected, a liquid crystalline polyester having methoxycarbonyl groups and/or hydroxyl groups as the end groups can be obtained.

Comparing Working Examples 1 to 5 of Table 7 with Comparative Examples 1 and 2 of Table 8, it can be seen that if the average: sequence length of the structural units obtained from 2-hydroxy-6-naphthoic acid is controlled in a range from 0.1 to 1, anisotropy, dielectric breakdown resistance, flowability, toughness, heat resistance and low self-gasification capability are excellent.

Further, from Working Examples 15 to 19 of Table 7, it can be seen that if the average sequence length of the structural units obtained from 2-hydroxy-6-naphthoic acid is controlled in a range from 0.2 to 0.8, the abovementioned effects can be especially remarkably exhibited.

Furthermore, comparing Working Examples 2 and, 6 to 14 of Table 7 with Comparative Examples 7 to 10 of Table 8, it can be seen that in our chemical composition range, such features as low anisotropy, dielectric breakdown resistance, flowability, toughness, heat resistance and low self-gasification capability can be especially remarkably exhibited.

From the comparison of Working Examples 2, 21 and 22 of Table 9, it can be seen that a liquid crystalline polyester having methoxycarbonyl groups at the ends is, excellent in low self-gasification capability, and a liquid crystalline polyester having methoxycarbonyl groups and hydroxyl groups at the ends are more excellent in low self-gasification capability.

Further, from Working Examples 22 to 24 of Table 9, it can be seen that when 3,5-t-butyl-4-hydroxybenzoic acid is contained as structural units of a liquid crystalline polyester, the effect of decreasing anisotropy can be obtained.

Moreover, the liquid crystalline polyester of Reference Example 1 was prepared to evaluate compositions.

Liquid Crystalline Polyester (B-1)

A 5-liter reactor equipped with stirring blades and a distillation pipe was charged with 669.9 g (4.85 moles) of p-hydroxybenzoic acid, 270.0 g (1.45 moles) of 4,4'-dihydroxybiphenyl, 68.3 g (0.62 mole) of hydroquinone, 224.3 g (1.35 moles) of terephthalic acid, 121.3 g (0.73 mole) of isophthalic acid and 983.1 g (1.07 equivalents based on the amount of all the phenolic hydroxyl groups of the system) of, acetic anhydride, and a reaction was performed with stirring in a nitrogen gas atmosphere at 145° C. for 2 hours and subsequently heated up to 330° C., taking 4 hours. Then the polymerization temperature was kept at 330° C., and the pressure was reduced to 133 Pa, taking 1.0 hour. The reaction was continued for further 60 minutes, and when the torque reached 20 kg·cm, the polycondensation was completed. Subsequently the reactor was internally pressurized to 0.1 MPa, and the polymer was discharged through a die having one circular discharge, port with a diameter of 10 mm as a strand, being pelletized by a cutter.

The Tm (the melting point of a liquid crystalline polyester) of the liquid crystalline polyester (B-1) was 314° C.

The melt viscosity measured by a Koka type flow tester (orifice 0.5 dia.×10 mm) at a temperature of 334° C. and at a shear rate of 1,000/s was 20 Pa·s. The number average molecular weight measured by GPC-LS (mixed solvent of pentafluorophenol/chloroform=50/50, 80° C.) was 12,600.

Reference Example 2

Filler

GF: E glass chopped strand (ECS-03T747H) produced by Nippon Electric Glass Co., Ltd. Working Examples 25 to 41 and Comparative Examples 11 to 15

Twin-screw extruder TEM35B (intermeshing screws rotating in the same direction) having cylinders C1 (a heater on the rear feeder side) to C6 (a heater on the die side) produced by Toshiba Machine Co., Ltd., in which a side feeder was installed at C3 while a vacuum vent was installed at C5.

A screw arrangement with kneading blocks built in C2 and C4 was used, and a liquid crystalline polyester (A-1, A-2, A-5, A-7, A-8, A-14, A-21, A-22 or A-23) alone or together with a liquid crystalline polyester (B-1), or a liquid crystalline polyester (C-1, C-3, C-4, C-6 or C-8) was supplied into the hopper by an amount shown in Tables 10 to 12. As the case might be, GF (E glass chopped strand (ECS-03T747H) produced by Japan Electric Glass Co., Ltd.) was supplied as a filler from the side feeder by an amount shown in Tables 10 to 12 per 100 parts by weight of the liquid crystalline polyester or the liquid crystalline polyester blend in total. The cylinder, temperature was set at the melting point of the liquid crystalline polyester (A-1, A-2, A-5, A-7, A-8, A-14, A-21, A-22 or A-23) or (C-1, C-3, C-4, C-6 or C-8) +10° C. The mixture was melt-kneaded to produce pellets.

The obtained composition pellets were dried in hot air and supplied into Fanuc α30C injection molding machine (produced by Fanuc), to obtain a molded article. As in Working Examples 1 to 24 and Comparative Examples 1 to 10, the abovementioned (4) anisotropy, (5) dielectric breakdown resistance, (6) flowability, (7) toughness, (8) heat resistance and (9) self-gasification rate were evaluated.

TABLE 10

| | Liquid crystalline polyester | | Filler | | Anisotropy | Dielectric breakdown voltage | Flowable length | Deflection | Melting point - Deflection temperature | Self-gasification rate |
|---|---|---|---|---|---|---|---|---|---|---|
| | Name | wt % | Name | wt % | (\|MD/\|TD\|) | (kv) | (mm) | (mm) | under load (° C.) | (wt %) |
| Working Example 25 | A-2, B-1 | 90, 10 | — | — | 1.6 | 55 | 115 | 10.2 | 40 | 0.09 |
| Working Example 26 | A-2, B-1 | 75, 25 | — | — | 2.2 | 54 | 105 | 9.7 | 42 | 0.11 |
| Working Example 27 | A-2, B-1 | 50, 50 | — | — | 2.2 | 50 | 101 | 9.7 | 43 | 0.13 |
| Working Example 28 | A-2, B-1 | 25, 75 | — | — | 2.5 | 49 | 90 | 9.4 | 46 | 0.13 |
| Working Example 29 | A-2, B-1 | 10, 90 | — | — | 2.8 | 45 | 87 | 9.1 | 48 | 0.13 |
| Working Example 30 | A-1 | 60 | GF | 40 | 1.7 | 59 | 56 | 3.5 | 6 | 0.12 |
| Working Example 31 | A-2 | 60 | GF | 40 | 1.5 | 62 | 62 | 4.2 | 3 | 0.06 |
| Working Example 32 | A-5 | 60 | GF | 40 | 1.8 | 59 | 57 | 3.5 | 6 | 0.12 |
| Working Example 33 | A-7 | 60 | GF | 40 | 1.5 | 63 | 59 | 4 | 8 | 0.1 |
| Working Example 34 | A-8 | 60 | GF | 40 | 2.1 | 58 | 56 | 3.4 | 8 | 0.11 |
| Working Example 35 | A-14 | 60 | GF | 40 | 2.4 | 56 | 44 | 2.5 | 11 | 0.15 |

TABLE 11

| | Liquid crystalline polyester | | Filler | | Anisotropy | Dielectric breakdown voltage | Flowable length | Deflection | Melting point - Deflection temperature | Self-gasification rate |
|---|---|---|---|---|---|---|---|---|---|---|
| | Name | wt % | Name | wt % | (\|MD/\|TD\|) | (kV) | (mm) | (mm) | under load (° C.) | (wt %) |
| Working Example 36 | A-21 | 60 | GF | 40 | 1.5 | 58 | 62 | 4.4 | 3 | 0.04 |
| Working Example 37 | A-22 | 60 | GF | 40 | 1.5 | 68 | 62 | 4.3 | 3 | 0.01 |
| Working Example 38 | A-23 | 60 | GF | 40 | 1.2 | 67 | 63 | 4.2 | 6 | 0.08 |
| Working Example 39 | A-2, B-1 | 54, 6 | GF | 40 | 1.2 | 65 | 67 | 4.9 | 10 | 0.05 |
| Working Example 40 | A-2, B-1 | 30, 30 | GF | 40 | 1 | 60 | 57 | 4.5 | 15 | 0.08 |
| Working Example 41 | A-2, B-1 | 6, 54 | GF | 40 | 1 | 55 | 48 | 4.5 | 19 | 0.08 |

TABLE 12

|  | Liquid crystalline polyester (C) | | Filler | | Anisotropy (|MD/|TD|) | Dielectric breakdown voltage (kV) | Flowable length (mm) | Deflection (mm) | Melting point - Deflection temperature under load (° C.) | Self-gasification rate (wt %) |
|---|---|---|---|---|---|---|---|---|---|---|
|  | Name | wt % | Name | wt % |  |  |  |  |  |  |
| Comparative Example 11 | C-1 | 60 | GF | 40 | 4.8 | 34 | 30 | 1.2 | 34 | 0.36 |
| Comparative Example 12 | C-3 | 60 | GF | 40 | 5.3 | 28 | 29 | 0.9 | 38 | 0.43 |
| Comparative Example 13 | C-4 | 60 | GF | 40 | 5 | 31 | 28 | 1.1 | 37 | 0.41 |
| Comparative Example 14 | C-6 | 60 | GF | 40 | 5.1 | 24 | 40 | 0.9 | 32 | 0.41 |
| Comparative Example 15 | C-8 | 60 | GF | 40 | 5.2 | 25 | 40 | 1.1 | 34 | 0.41 |

From Working Examples 25 to 29 of Table 10, it can be seen that compositions containing our liquid crystalline polyesters (A) and (B) anisotropy and that when such compositions are in a preferred composition ratio range, the effect of enhancing toughness and flowability can also be obtained. Comparing Working Examples 30 to 35 of Table 10, Working Examples 36 to 41 of Table 11, and Comparative Examples 11 to 15 of Table 9, it can be seen that if a filler is added to the compositions comprising our liquid crystalline polyesters (A) and (B), the filler provides an effect of enhancing the deflection temperature under load and further a higher effect of enhancing toughness.

Industrial Applicability

The liquid crystalline polyester can be used as thin-walled small-sized articles required to have high heat resistance and high dimensional stability, such as SMT connectors and optical pickup parts.

The invention claimed is:

1. A liquid crystalline polyester (A) comprising 38 to 74 mol % of structural units obtained from a hydroxycarboxylic acid, 13 to 31 mol % of structural units obtained from 4,4'-hydroxybiphenyl and 13 to 31 mol % of structural units obtained from 2,6-naphthalenedicarboxylic acid, based on 100 mol % of polyester (A), wherein 89 mol % or more of structural units obtained from the hydroxycarboxylic acid are structural units obtained from 2-hydroxy-6-naphthoic acid, and average sequence length of structural units obtained from the 2-hydroxy-6-naphthoic acid is 0.1 to 1.

2. The liquid crystalline polyester (A) according to claim 1, wherein the hydroxycarboxylic acid is 2-hydroxy-6-naphthoic acid.

3. The liquid crystalline polyester (A) according to claim 1, which comprises 40 to 44 mol % of structural units obtained from a hydroxycarboxylic acid, 28 to 30 mol % of structural units obtained from 4,4'-dihydroxybiphenyl and 28 to 30 mol % of structural units obtained from 2,6-naphthalenedicarboxylic acid, wherein the hydroxycarboxylic acid is 2-hydroxy-6-naphthoic acid.

4. The liquid crystalline polyester (A) according to claim 1, wherein 89 to 99.9 mol % of structural units obtained from the hydroxycarboxylic acid are structural units obtained from 2-hydroxy-6-naphthoic acid, while 0.1 to 11 mol % are structural units obtained from 3,5-di-t-butyl-4-hydroxybenzoic acid.

5. The liquid crystalline polyester (A) according to claim 1, having methoxycarbonyl groups as the end groups.

6. A process for producing the liquid crystalline polyester (A) of claim 1, comprising melt-polymerizing the liquid crystalline polyester (A) in a temperature range from (melting point of the liquid crystalline polyester (A) +20° C.) to (the melting point of the liquid crystalline polyester (A)+40° C.).

7. The process according to claim 6, wherein the melt polymerization runs within a temperature range and at a highest temperature within that range for 1 to 3 hours.

8. The process according to claim 6, wherein two or more steps selected from the step of polymerizing by de-acetic acid polycondensation of acetyl groups and a carboxylic acid, the step of polymerizing by de-methyl acetate polycondensation of methoxycarbonyl groups and acetyl groups, and the step of polymerizing by de-methanol polycondensation of methoxycarbonyl groups and hydroxyl groups, are combined.

9. A liquid crystalline polyester composition obtained by mixing a liquid crystalline polyester (B) comprising structural units I-V with the liquid crystalline polyester (A) of claim 1.

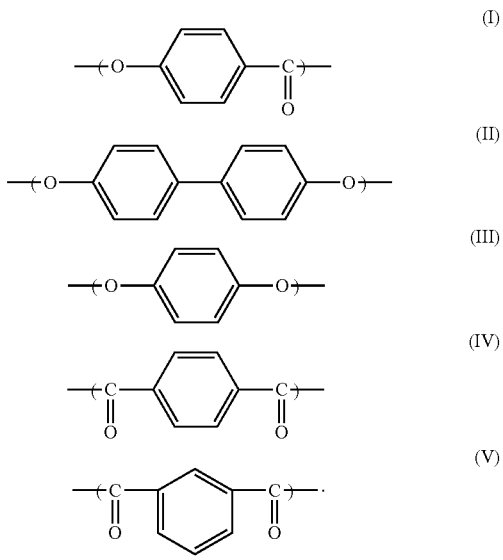

10. A liquid crystalline polyester composition obtained by mixing 0.1 to 200 parts by weight of a filler with 100 parts by weight of the liquid crystalline polyester of claim 1.

11. A molded article obtained by molding the liquid crystalline polyester of claim 1.

12. The process according to claim 7, wherein two or more steps selected from the step of polymerizing by de-acetic acid polycondensation of acetyl groups and the step of polymerizing by de-methyl acetate polycondensation of methoxycarbonyl groups and acetyl groups, and the step of polymerizing by de-methanol polycondensation of methoxycarbonyl groups and hydroxyl groups, are combined.

* * * * *

UNITED STATES PATENT AND TRADEMARK OFFICE
CERTIFICATE OF CORRECTION

PATENT NO. : 8,580,145 B2  
APPLICATION NO. : 13/386584  
DATED : November 12, 2013  
INVENTOR(S) : Osato et al.

Page 1 of 1

It is certified that error appears in the above-identified patent and that said Letters Patent is hereby corrected as shown below:

In the Specification

<u>In Column 17</u>

At line 46, please change "10103 g" to -- 1010.7 g --.

Signed and Sealed this  
Twenty-second Day of July, 2014

Michelle K. Lee  
*Deputy Director of the United States Patent and Trademark Office*